United States Patent
Geisner et al.

(10) Patent No.: US 10,223,832 B2
(45) Date of Patent: Mar. 5, 2019

(54) PROVIDING LOCATION OCCUPANCY ANALYSIS VIA A MIXED REALITY DEVICE

(71) Applicant: Microsoft Technology Licensing, LLC, Redmond, WA (US)

(72) Inventors: Kevin A. Geisner, Mercer Island, WA (US); Darren Bennett, Seattle, WA (US); Relja Markovic, Seattle, WA (US); Stephen G. Latta, Seattle, WA (US); Daniel J. McCulloch, Kirkland, WA (US); Jason Scott, Kirkland, WA (US); Ryan L. Hastings, Seattle, WA (US); Alex Aben-Athar Kipman, Redmond, WA (US); Andrew John Fuller, Redmond, WA (US); Jeffrey Neil Margolis, Seattle, WA (US); Kathryn Stone Perez, Kirkland, WA (US); Sheridan Martin Small, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/865,410

(22) Filed: Sep. 25, 2015

(65) Prior Publication Data
US 2016/0086382 A1 Mar. 24, 2016

Related U.S. Application Data

(63) Continuation of application No. 13/361,923, filed on Jan. 30, 2012, now Pat. No. 9,153,195, and a (Continued)

(51) Int. Cl.
G09G 5/00 (2006.01)
G06T 19/00 (2011.01)
(Continued)

(52) U.S. Cl.
CPC ........ *G06T 19/006* (2013.01); *G02B 27/0172* (2013.01); *G06F 3/002* (2013.01); (Continued)

(58) Field of Classification Search
CPC . G06T 19/006; G06T 19/00; G06T 2219/024; G06T 3/005; G06T 2215/16; (Continued)

(56) References Cited

U.S. PATENT DOCUMENTS 4,934,773 A 6/1990 Becker
5,016,282 A 5/1991 Tomono et al.
(Continued)

FOREIGN PATENT DOCUMENTS

CN 101026776 8/2007
EP 1710002 10/2006
(Continued)

OTHER PUBLICATIONS

Amendment dated Oct. 16, 2014 in U.S. Appl. No. 13/361,923.
(Continued)

*Primary Examiner* — Xilin Guo
(74) *Attorney, Agent, or Firm* — Arent Fox LLP

(57) ABSTRACT

The technology provides contextual personal information by a mixed reality display device system being worn by a user. A user inputs person selection criteria, and the display system sends a request for data identifying at least one person in a location of the user who satisfy the person selection criteria to a cloud based application with access to user profile data for multiple users. Upon receiving data identifying the at least one person, the display system outputs data identifying the person if he or she is within the field of view. An identifier and a position indicator of the person in the location is output if not. Directional sensors on the display device may also be used for determining a
(Continued)

position of the person. Cloud based executing software can identify and track the positions of people based on image and non-image data from display devices in the location.

20 Claims, 15 Drawing Sheets

Related U.S. Application Data continuation-in-part of application No. 13/212,172, filed on Aug. 17, 2011.

(51) Int. Cl.
   *G06F 3/00* (2006.01)
   *G06Q 50/00* (2012.01)
   *G06F 3/01* (2006.01)
   *G02B 27/01* (2006.01)
   *G06F 3/0484* (2013.01)

(52) U.S. Cl.
   CPC .............. *G06F 3/011* (2013.01); *G06F 3/012* (2013.01); *G06F 3/013* (2013.01); *G06F 3/04842* (2013.01); *G06Q 50/01* (2013.01); *G09G 5/00* (2013.01); *G02B 2027/014* (2013.01); *G02B 2027/0138* (2013.01)

(58) Field of Classification Search
   CPC ....... G06T 5/007; G06T 5/20; G06F 3/04842; G06F 3/0484; G06F 3/002; G06F 3/011; G06F 3/013; G06F 3/012; G06F 3/0346; G02B 27/0172; G02B 2027/0138; G02B 2027/014; G02B 27/01; G02B 27/0179; G02B 27/0093; G02B 27/0081; G02B 2027/0141; G02B 2027/0185; G02B 27/017; G09G 5/00; G06Q 50/01; H04M 3/42; H04M 3/52374; H04L 51/00; H04L 67/18; H04W 4/02; H04W 4/12
   See application file for complete search history.

(56) References Cited

U.S. PATENT DOCUMENTS

| | | | |
|---|---|---|---|
| 5,307,170 A | 4/1994 | Itsumi et al. |
| 5,471,542 A | 11/1995 | Ragland |
| 5,486,860 A | 1/1996 | Shiokawa et al. |
| 5,689,619 A | 11/1997 | Smyth |
| 6,046,712 A | 4/2000 | Beller et al. |
| 6,053,610 A | 4/2000 | Kurtin et al. |
| 6,069,742 A | 5/2000 | Silver |
| 6,351,335 B1 | 2/2002 | Perlin |
| 6,433,760 B1 | 8/2002 | Vaissie et al. |
| 6,456,262 B1 | 9/2002 | Bell |
| 6,466,207 B1 | 10/2002 | Gortler et al. |
| 6,522,479 B2 | 2/2003 | Yahagi |
| 6,578,962 B1 | 6/2003 | Amir et al. |
| 6,597,346 B1 | 7/2003 | Havey et al. |
| 6,618,208 B1 | 9/2003 | Silver |
| 6,659,611 B2 | 12/2003 | Amir et al. |
| 6,711,414 B1 | 3/2004 | Lightman et al. |
| 6,738,040 B2 | 5/2004 | Jahn et al. |
| 6,760,046 B2 | 7/2004 | I'Anson et al. |
| 6,842,175 B1 | 1/2005 | Schmalstieg et al. |
| 6,886,137 B2 | 4/2005 | Peck et al. |
| 6,968,334 B2 | 11/2005 | Salmenkaita et al. |
| 6,975,991 B2 | 12/2005 | Basson et al. |
| 7,130,447 B2 | 10/2006 | Aughey et al. |
| 7,133,077 B2 | 11/2006 | Higuma et al. |
| 7,137,069 B2 | 11/2006 | Abbott et al. |
| 7,262,926 B2 | 8/2007 | Ohsato |
| 7,340,438 B2 | 3/2008 | Nordman et al. |
| 7,362,522 B2 | 4/2008 | Ohsato |
| 7,391,887 B2 | 6/2008 | Durnell |
| 7,396,129 B2 | 7/2008 | Endrikhovski et al. |
| 7,401,300 B2 | 7/2008 | Nurmi |
| 7,401,920 B1 | 7/2008 | Kranz et al. |
| 7,457,434 B2 | 11/2008 | Azar |
| 7,493,153 B2 | 2/2009 | Ahmed et al. |
| 7,522,344 B1 | 4/2009 | Curatu et al. |
| 7,532,196 B2 | 5/2009 | Hinckley |
| 7,532,230 B2 | 5/2009 | Culbertson et al. |
| 7,533,988 B2 | 5/2009 | Ebisawa |
| 7,542,210 B2 | 6/2009 | Chirieleison, Sr. |
| 7,686,451 B2 | 3/2010 | Cleveland |
| 7,736,000 B2 | 6/2010 | Enriquez et al. |
| 7,805,528 B2 | 9/2010 | Park et al. |
| 7,822,607 B2 | 10/2010 | Aoki et al. |
| 7,843,471 B2 | 11/2010 | Doan et al. |
| 7,948,451 B2 | 5/2011 | Gustafsson et al. |
| 8,184,070 B1 | 5/2012 | Taubman |
| 8,209,183 B1 | 6/2012 | Patel et al. |
| 8,223,088 B1 | 7/2012 | Gomez et al. |
| 8,743,145 B1 | 6/2014 | Price |
| 9,111,326 B1 | 8/2015 | Worley, III et al. |
| 9,323,325 B2 | 4/2016 | Perez et al. |
| 2002/0075286 A1 | 6/2002 | Yonezawa et al. |
| 2002/0149583 A1 | 10/2002 | Segawa |
| 2002/0158873 A1 | 10/2002 | Williamson |
| 2004/0008157 A1 | 1/2004 | Brubaker et al. |
| 2004/0239670 A1 | 12/2004 | Vlarks Richard |
| 2005/0047629 A1 | 3/2005 | Farrell et al. |
| 2005/0197846 A1 | 9/2005 | Ezaris et al. |
| 2005/0206583 A1 | 9/2005 | Lemelson et al. |
| 2006/0007308 A1 | 1/2006 | Ide et al. |
| 2006/0115130 A1 | 6/2006 | Kozlay |
| 2006/0146012 A1 | 7/2006 | Arneson et al. |
| 2006/0227151 A1 | 10/2006 | Bannai |
| 2006/0250322 A1 | 11/2006 | Hall et al. |
| 2006/0270419 A1* | 11/2006 | Crowley ................. H04M 3/42 455/456.2 |
| 2007/0081726 A1 | 4/2007 | Westerman |
| 2007/0167689 A1 | 7/2007 | Ramadas et al. |
| 2007/0201859 A1 | 8/2007 | Sarrat |
| 2007/0250901 A1 | 10/2007 | McIntire et al. |
| 2008/0002262 A1 | 1/2008 | Chirieleison |
| 2008/0007689 A1 | 1/2008 | Silver |
| 2008/0024392 A1 | 1/2008 | Gustafsson et al. |
| 2008/0024597 A1 | 1/2008 | Yang et al. |
| 2008/0084532 A1 | 4/2008 | Kurth Stephen |
| 2008/0117289 A1 | 5/2008 | Schowengerdt et al. |
| 2008/0133336 A1* | 6/2008 | Altman ............... G06Q 30/0207 455/456.1 |
| 2008/0158096 A1 | 7/2008 | Breed |
| 2008/0181452 A1 | 7/2008 | Kwon et al. |
| 2008/0195956 A1 | 8/2008 | Baron |
| 2008/0211771 A1 | 9/2008 | Richardson |
| 2009/0005961 A1 | 1/2009 | Grabowski et al. |
| 2009/0055739 A1 | 2/2009 | Murillo et al. |
| 2009/0100076 A1 | 4/2009 | Hamilton, II et al. |
| 2009/0125590 A1 | 5/2009 | Hayano et al. |
| 2009/0158206 A1 | 6/2009 | Myllyla |
| 2009/0174946 A1 | 7/2009 | Raviv et al. |
| 2009/0187389 A1 | 7/2009 | Dobbins et al. |
| 2009/0187933 A1 | 7/2009 | Rittler et al. |
| 2009/0189974 A1 | 7/2009 | Deering |
| 2009/0217211 A1 | 8/2009 | Hildreth et al. |
| 2009/0221368 A1 | 9/2009 | Yen et al. |
| 2009/0225001 A1 | 9/2009 | Biocca et al. |
| 2009/0233548 A1 | 9/2009 | Andersson et al. |
| 2009/0243968 A1 | 10/2009 | Nakazawa |
| 2009/0284608 A1 | 11/2009 | Hong et al. |
| 2009/0286570 A1 | 11/2009 | Pierce |
| 2009/0287490 A1 | 11/2009 | Cragun et al. |
| 2009/0289955 A1 | 11/2009 | Douris |
| 2009/0289956 A1* | 11/2009 | Douris ................. G01C 21/3602 345/633 |
| 2010/0010826 A1 | 1/2010 | Rosenthal et al. |
| 2010/0017728 A1 | 1/2010 | Cho et al. |
| 2010/0056274 A1 | 3/2010 | Uusitalo et al. |
| 2010/0079356 A1 | 4/2010 | Hoellwarth |
| 2010/0197399 A1 | 8/2010 | Geiss |

(56) References Cited

U.S. PATENT DOCUMENTS

| | | | |
|---|---|---|---|
| 2010/0199232 | A1 | 8/2010 | Mistry |
| 2010/0204984 | A1 | 8/2010 | Yang |
| 2010/0231706 | A1 | 9/2010 | Maguire, Jr. |
| 2010/0238161 | A1 | 9/2010 | Varga et al. |
| 2010/0257252 | A1 | 10/2010 | Dougherty et al. |
| 2010/0303289 | A1 | 12/2010 | Polzin |
| 2010/0306647 | A1 | 12/2010 | Zhang et al. |
| 2010/0306715 | A1 | 12/2010 | Geisner et al. |
| 2010/0332668 | A1 | 12/2010 | Shah et al. |
| 2011/0022196 | A1 | 1/2011 | Linsky et al. |
| 2011/0112934 | A1 | 5/2011 | Ishihara |
| 2011/0115816 | A1 | 5/2011 | Brackney |
| 2011/0126272 | A1 | 5/2011 | Betzler et al. |
| 2011/0181497 | A1 | 7/2011 | Raviv |
| 2011/0188760 | A1 | 8/2011 | Wright et al. |
| 2011/0205242 | A1 | 8/2011 | Friesen |
| 2011/0219291 | A1 | 9/2011 | Lisa |
| 2011/0221656 | A1 | 9/2011 | Haddick et al. |
| 2011/0292076 | A1 | 12/2011 | Wither et al. |
| 2011/0316845 | A1 | 12/2011 | Roberts |
| 2012/0019557 | A1 | 1/2012 | Aronsson et al. |
| 2012/0021828 | A1 | 1/2012 | Raitt et al. |
| 2012/0026277 | A1* | 2/2012 | Malzbender ............ H04N 7/15 348/14.07 |
| 2012/0041822 | A1* | 2/2012 | Landry .............. G06Q 30/0261 705/14.58 |
| 2012/0079018 | A1 | 3/2012 | Rottler et al. |
| 2012/0083244 | A1 | 4/2012 | Verthein et al. |
| 2012/0105486 | A1 | 5/2012 | Lankford et al. |
| 2012/0127062 | A1 | 5/2012 | Bar-Zeev et al. |
| 2012/0143361 | A1 | 6/2012 | Kurabayashi et al. |
| 2012/0204222 | A1 | 8/2012 | Bodi |
| 2012/0210255 | A1 | 8/2012 | Ooi et al. |
| 2012/0218263 | A1 | 8/2012 | Meier et al. |
| 2012/0249741 | A1 | 10/2012 | Maciocci et al. |
| 2012/0270578 | A1 | 10/2012 | Feghali et al. |
| 2012/0303610 | A1 | 11/2012 | Zhang |
| 2013/0024577 | A1 | 1/2013 | Krishnaswamy |
| 2013/0042296 | A1 | 2/2013 | Hastings et al. |
| 2013/0107021 | A1 | 5/2013 | Maizels et al. |
| 2013/0169682 | A1 | 7/2013 | Novak et al. |
| 2015/0095158 | A1 | 4/2015 | Nasserbakht et al. |

FOREIGN PATENT DOCUMENTS

| | | |
|---|---|---|
| JP | 09204287 A | 8/1997 |
| JP | 2002041234 A | 2/2002 |
| JP | 2002163670 A | 6/2002 |
| JP | 2002223458 A | 8/2002 |
| JP | 2003508808 A | 3/2003 |
| JP | 2003132068 A | 5/2003 |
| JP | 2006145922 A | 6/2006 |
| JP | 2010218405 A | 9/2010 |
| KR | 1020030054603 A | 7/2003 |
| KR | 1020030056302 A | 7/2003 |
| KR | 20110107542 | 10/2011 |
| WO | 2005124429 A1 | 12/2005 |
| WO | 2007015184 | 2/2007 |
| WO | 2007015184 A1 | 2/2007 |
| WO | 2007066166 A1 | 6/2007 |
| WO | 2007085303 A1 | 8/2007 |
| WO | 2011045276 | 4/2011 |
| WO | 2013023706 A1 | 2/2013 |

OTHER PUBLICATIONS

Amendment dated Mar. 9, 2014 in U.S. Appl. No. 13/361,923.
Office Action dated Nov. 19, 2015 in U.S. Appl. No. 13/689,453.
Collaborative Augmented Reality for Outdoor Navigation and Information Browsing, (pp. 31-41), Reitmayr, G. & Schmalstieg, D., (2004).
Response to Office Action filed Feb. 26, 2016 in U.S. Appl. No. 13/689,453, 11 pages.
Office Action dated Apr. 11, 2016 in U.S. Appl. No. 13/689,453, 30 pages.
Office Action dated Apr. 15, 2016 in U.S. Appl. No. 13/689,471, 133 pages.
Office Action dated Mar. 27, 2015 in U.S. Appl. No. 13/689,453, 52 pages.
Office Action dated Apr. 10, 2014 in U.S. Appl. No. 13/212,172, 45 pages.
Response to Office Action filed Aug. 11, 2014 in U.S. Appl. No. 13/212,172, 16 pages.
Final Office Action dated Sep. 18, 2014 in U.S. Appl. No. 13/212,172, 41 pages.
International Search Report and Written Opinion dated Jan. 14, 2013 in International Patent Application No. PCT/US2012/052136, 9 pages.
English translation of Abstract for WO2011045276 published Apr. 21, 2011, 2 pages.
English translation of Abstract for KR20110107542 published Oct. 4, 2011, 2 pages.
International Search Report and Written Opinion dated Nov. 29, 2012 in International Patent Application No. PCT/US2012/051954, 9 pages.
Office Action dated Aug. 5, 2013, U.S. Appl. No. 13/689,453, 34 pages.
Response to Office Action filed Nov. 5, 2013 in U.S. Appl. No. 12/689,453, 8 pages.
Office Action dated Mar. 14, 2014 in U.S. Appl. No. 12/689,453, 12 pages.
Response to Office Action filed Jun. 10, 2014 in U.S. Appl. No. 12/689,453, 10 pages.
Interview Summary dated Jun. 18, 2014, U.S. Appl. No. 13/689,453, 3 pages.
Office Action dated Apr. 2, 2013 in U.S. Appl. No. 12/970,695, 53 pages.
Response to Office Action filed Oct. 1, 2013 in U.S. Appl. No. 12/970,695, 13 pages.
Final Office Action dated Jan. 16, 2014 in U.S. Appl. No. 12/970,695, 28 pages.
Response to Final Office Action filed Jul. 12, 2014 in U.S. Appl. No. 12/970,695, 12 pages.
Office Action dated Feb. 12, 2014 in Chinese Patent Application No. 201110443987, with English notification sheet, 12 pages.
English Abstract of CN101026776A published Aug. 29, 2007, 2 pages.
Response to Office Action filed Jun. 26, 2014 in Chinese Patent Application No. 201110443987, with English claims, 17 pages.
Second Office Action dated Jul. 29, 2014 in Chinese Patent Application No. 201110443987, with English Summary of the Office Action, 10 pages.
Response to Second Office Action filed Oct. 13, 2014 in Chinese Patent Application No. 201110443987, with English claims, 8 pages.
U.S. Appl. No. 13/689,453, filed Nov. 29, 2012.
U.S. Appl. No. 13/689,471, filed Nov. 29, 2012.
Selker, "Visual Attentive Interfaces,"—Published Date: Oct. 2004, BT Technology Journal, vol. 22, No. 4, pp. 146-150. Retrieved from the Internet by May 5, 2011 http://web.media.mit.edu/-walter/bttj/Paper16Pages146-150.pdf, 5 pages.
Guan et al., "Real-Time 3D Pointing Gesture Recognition for Natural HCI,"—Proceedings of the 7th World Congress on Intelligent Control and Automation, Jun. 25-27, 2008, Chongqing, China, pp. 2433-2436 http://ieeexplore.ieee.org/stamp/stamp.jsp?tp=&arnumber=4593304, 4 pages.
Gade et al., "Person Localization in a Wearable Camera Platform towards Assistive Technology for Social Interactions," Special Issue of Media Solutions that Improve Accessibility to Disabled Users, Ubiquitous Computing and Communication Journal, MSIADU, vol. 5, No. 1, Mar. 10, 2010 and—Retrieved from the Internet: May 5, 2011, http://www.ubicc.org/files/pdf/7_424.pdf, 12 pages.
Depalma, "Leveraging Online Virtual Agents to Crowdsource Human-Robot Interaction," posted Mar. 25, 2011. Retrieved from the Internet: May 5, 2011, http://crowdresearch.org/blog/?p=68, 1 page.

(56) References Cited

OTHER PUBLICATIONS

Ajanki, et al., "Contextual Information Access with Augmented Reality," In Proceedings of IEEE International Workshop on Machine Learning for Signal Processing (MLSP), Aug. 29-Sep. 1, 2010, pp. 95-100.
Ajanki, et al., "Ubiquitous Contextual Information Access with Proactive Retrieval and Augmentation," Proceedings of the Fourth International Workshop in Ubiquitous Augmented Reality (IWUVR 2010), May 17, 2010, Helsinki, Finland, 5 pages.
U.S. Appl. No. 13/216,647, filed Aug. 24, 2011.
Barras, Colin, "Innovation: Gaze trackers eye computer gamers," NewScientist [online], Mar. 26, 2010. Retrieved from the internet on Aug. 26, 2010: URL: <http://www.newscientist.com/article/dn18707-innovation-gaze-trackers-e>, 4 pages.
Bier et al., "Toolglass and Magic Lenses: The See-Through Interface," Proceedings of the 20th Annual Conference and Exhibition on Computer Graphics and Interactive Techniques (SIGGRAPH '93), Aug. 2-6, 1993, Anaheim, California, USA, 17 pages.
"Gaze-enhanced User Interface Design," Stanford HCI Group [online]. Retrieved from the Internet on Aug. 27, 2010: URL: <http://hci.stanford.edu/research/GUIDe/>, 3 pages.
Kemp, Miles, "Augmented Reality Glasses Concept by Nokia," Spatial Robots [online]. Sep. 23, 2009. Retrieved from the Internet on Aug. 26, 2010: URL: <http://www.spatialrobots.com/2009/09/augmented-reality-glasses-concept-by-nokia/>, 6 pages.
Liarokapis, Fotis, "An Augmented Reality Interface for Visualizing and Interacting with Virtual Content," Draft Paper to Appear in Journal of Virtual Reality, vol. 11, Issue 1, Feb. 2007, 18 pages.
Nilsson et al., "Hands Free Interaction with Virtual Information in a Real Environment: Eye Gaze as an Interaction Tool in an Augmented Reality System," PsychNology Journal, vol. 7, No. 2, pp. 175-196, Apr. 28, 2009, 22 pages.
Nokia Has Been Fine-Tuning Eye-Tracking Glasses. Symbian-Guru.com [online], Sep. 6, 2009. Retrieved from the Internet on Aug. 26, 2010: URL: <http://www.symbian-guru.com/welcome/2009/09/nokia-has-been-fine-tuning-eye-tracking-glasses.html>, 3 pages.
Peters, Brandon, "Pupil Size Can objectively Identify Sleepiness, Sleep Deprivation," Pupillometry Often Used in Research Selling, About.com [online], Mar. 25, 2010 [retrieved on Aug. 9, 2011], Retrieved from the Internet: <URL: http://sleepdisorders.about.com/od/doihaveasleepdisorder/qt/Pupil_Size.htm>, 1 page.
Partala, et al., "Pupil size variation as an indication of affective processing," International Journal of Human-Computer Studies, Jul. 2003, vol. 59, Issue 1-2, pp. 185-198, Academic Press, Inc., Duluth, MN, USA, 14 pages.
"Visual perception," Wikipedia [online]. Retrieved from the Internet on Aug. 26, 2010: URL: >http://en.wikipedia.org/wiki/Visual_perception>, 6 pages.
U.S. Appl. No. 12/970,695, filed Dec. 16, 2010.
U.S. Appl. No. 13/212,172, filed Aug. 17, 2011.
Hollerer et al., "Exploring MARS: Developing Indoor and Outdoor User Interfaces to a Mobile Augmented Reality System," Computers and Graphics 23(6), pp. 779-785, Elsevier Science Limited, Aug. 26, 1999, 12 pages.
Hua et al., "Using a Head Mounted Projective Display in Interactive Augmented Environments," Proceedings of IEEE and ACM International Symposium on Augmented Reality, 2001, pp. 217-223, 7 pages.
Notice of Allowance and Fees Due dated May 28, 2015 in U.S. Appl. No. 13/361,923.
Non-Final Rejection dated May 15, 2014 in U.S. Appl. No. 13/361,923.
Non-Final Rejection dated Sep. 12, 2013 in U.S. Appl. No. 13/361,923.
Final Rejection dated Jan. 26, 2015 in U.S. Appl. No. 13/361,923.
Amendment dated Apr. 10, 2015 in U.S. Appl. No. 13/361,923.
Notice of Allowance dated Oct. 5, 2016 in U.S. Appl. No. 13/689,453, 12 pages.
Response to Office Action filed Jul. 17, 2016 in U.S. Appl. No. 13/689,453, 12 pages.
Office Action dated Aug. 8, 2016 in U.S. Appl. No. 13/689,453, 44 pages.
Response to Office Action filed Sep. 26, 2016 in U.S. Appl. No. 13/689,453, 8 pages.
Response to Office Action filed Jul. 15, 2016 in U.S. Appl. No. 13/689,471, 11 pages.
Notice of Allowance dated Aug. 26, 2016 in U.S. Appl. No. 13/689,471, 17 pages.
U.S. Appl. No. 15/389,098, filed Dec. 22, 2016.
"Office Action and Search Report Issued in Taiwan Application No. 100140759", dated Nov. 3, 2015, 11 Pages.
"Office Action Issued in European Patent Application No. 11849398.0", dated Jun. 9, 2015, 5 Pages.
"Response Filed in European Patent Application No. 11849398.0", Filed Date: Jul. 14, 2015, 13 Pages.
"Supplementary Search Report Issued in European Patent Application No. 11849398.0", dated Apr. 16, 2015, 3 Pages.
"Notice of Allowance Issued in U.S. Appl. No. 12/970,695", dated Aug. 6, 2015, 7 Pages.
"Final Office Action Issued in U.S. Appl. No. 13/212,172", dated Dec. 18, 2015, 30 Pages.
"Final Office Action Issued in U.S. Appl. No. 13/212,172", dated Oct. 17, 2016, 43 Pages.
"Final Office Action Issued in U.S. Appl. No. 13/212,172", dated Jun. 26, 2015, 40 Pages.
"Non-Final Office Action Issued in U.S. Appl. No. 13/212,172", dated Feb. 12, 2015, 28 Pages.
"Non-Final Office Action Issued in U.S. Appl. No. 13/212,172", dated Sep. 16, 2015, 34 Pages.
"Non-Final Office Action Issued in U.S. Appl. No. 13/212,172", dated Jun. 21, 2017, 44 Pages.
"Non-Final Office Action Issued in U.S. Appl. No. 13/212,172", dated May 10, 2016, 37 Pages.
"Notice of Allowance Issued in U.S. Appl. No. 13/212,172", dated Mar. 14, 2018, 9 Pages.
"Notice of Allowance Issued in U.S. Appl. No. 13/212,172", dated Oct. 19, 2017, 8 Pages.
"Notice of Allowance Issued in Chinese Patent Application No. 201110443987.0", dated Apr. 2, 2015, 4 Pages.
"Response Filed in Chinese Patent Application No. 201110443987.0", Filed Date: Feb. 11, 2015, 19 Pages.
"Third Office Action Received for Chinese Patent Application No. 201110443987.0", dated Dec. 3, 2014, 6 Pages.
"Office Action Issued in Japanese Patent Application No. 2013-544548", dated Dec. 22, 2015, 8 Pages.
"International Search Report and Written Opinion Issued in PCT Patent Application No. PCT/US2011/063350", dated Apr. 24, 2012, 10 Pages.
"Head Fixed Eye Tracking System Specifications", Retrieved from: http://www.arringtonresearch.com/techinfo.html, Retrieved date: Jun. 10, 2011, 2 Pages.
"Helmet Mounted Display (HMO) with Built-In Eye Tracker", In National Aerospace Laboratory (NLR), Jan. 2009, 4 Pages.
"Vibrating Lens Gives Movie Camera Great Depth of Focus", In Magazine-Popular Science, vol. 140, Issue 5, May 1942, pp. 88-89.
"Office Action Issued in Korean Patent Application No. 10-2013-7015226", dated Mar. 21, 2018, 13 Pages.
"Office Action Issued in European Patent Application No. 11849398.0", dated Feb. 8, 2018, 5 Pages.
"Non-Provisional Application Filed in U.S. Appl. No. 13/216,153", filed Aug. 23, 2011, 76 Pages.
"Final Office Action Issued in U.S. Appl. No. 13/221,770", dated Apr. 18, 2014, 22 Pages.
"Final Office Action Issued in U.S. Appl. No. 13/221,770", dated Jul. 24, 2015, 35 Pages.
"Non-Final Office Action Issued in U.S. Appl. No. 13/221,770", dated Oct. 10, 2013, 41 Pages.
"Non-Final Office Action Issued in U.S. Appl. No. 13/221,770", dated Jan. 26, 2015, 35 Pages.
Akeley, et al., "A Stereo Display Prototype with Multiple Focal Distances", In Proceedings of the ACM Transactions pn Graphics, vol. 23, Issue 3, Aug. 8, 2004, pp. 804-813.
Banks, et al., "All Friends are Not Created Equal: An Interaction Intensity based Approach to Privacy in Online Social Networks", In

(56) References Cited

OTHER PUBLICATIONS

Proceedings of the International Conference on Computational Science and Engineering, vol. 1, Aug. 29, 2009, pp. 970-974.
Beach, et al., "Touch Me wear:Getting Physical with Social Networks", In International Conference on Computational Science and Engineering, vol. 4, Aug. 29, 2009, 6 Pages.
Blum, et al., "The Effect of Out-of-focus Blur on Visual Discomfort When Using Stereo Displays", In Proceedings of be 9th International Symposium on Mixed and Augmented Reality, Oct. 13, 2010, pp. 13-17.
Buchegger, Sonja, "Ubiquitous Social Networks", Ubicomp Grand Challenge, Ubiquitous Computing at a crossroads Workshop, Jan. 6, 2009, 2 Pages.
Chen, et al., "Research on Eye-gaze Tracking Network Generated by Augmented Reality Application", In Proceedings of the Second International Workshop on Knowledge Discovery and Data Mining, Jan. 23, 2009, pp. 594-597.
Ebisawa, Yoshinobu, "Unconstrained Pupil Detection Technique Using Two Light Sources and the Image Difference Method", In Visualization and Intelligent Design in Engineering and Architecture II, Jan. 1995, 11 Pages.
Gang, Wen, "Chapter 3 Gaze Estimation System", in National University of Singapore, Jan. 2004, 10 Pages.
Gong, et al., "Dynamic Privacy Management in Pervasive Sensor Networks",In Proceedings of International Joint Conference on Ambient Intelligence, Springer Berlin Heidelberg, Nov. 10, 2010, pp. 96-106.
Handa, et al., "Development of Head-Mounted Display with Eye-Gaze Detection Function for the Severely Disabled", In IEEE International Conference on Virtual Environments, Human-Computer Interfaces, and Measurement Systems, Jul. 14, 2008, pp. 140-144.
Hennessey, et al., "A Single Camera Eye-Gaze Tracking System with Free Head Motion", In Proceedings of the 2006 Symposium on Eye Tracking Research and Applications, Mar. 27, 2006, pp. 87-94.
Herbelin, et al., "Coding gaze tracking data with chromatic gradients for VR Exposure Therapy", In Proceedings of the 17th International Conference on Artificial Reality and Telexistence, Nov. 28, 2007, 8 Pages.
Hillaire, et al., "Using an Eye-Tracking System to Improve Camera Motions and Depth-of-Field Blur Effects in Virtual nvironments", In Proceedings of the IEEE Virtual Reality Conference, Mar. 8, 2008, 2 Pages.
Johnson, Joel, "How Oil-Filled Lenses are Bringing Sight to Those in Need", Retrieved from: http://gizmodo.com/5463368/how-oil-filled-lenses-are-bringing-sight-to-those-in-need, Feb. 3, 2010, 4 Pages.
Kim, et al., "Vision-Based Eye-Gaze Tracking for Human Computer Interface", In Proceedings of the Conference on Systems, Man, and Cybernetics, vol. 2, Oct. 12, 1999, pp. 324-329.
Kollenberg, et al., "Visual Search in the (Un)Real World: How Head-Mounted Displays Affect Eye Movements, Head Movements and Target Detection", In Proceedings of the 2010 Symposium on Eye-Tracking Research & Applications, Mar. 22 , 2010, 4 Pages.
Laibowitz, et al., "Wearable Sensing for Dynamic Management of Dense Ubiquitous Media", In Sixth International Workshop on Wearable and Implantable Body Sensor Networks, Jun. 3, 2009, pp. 3-8.
Lee, et al., "Robust Gaze Tracking Method for Stereoscopic Virtual Reality Systems", In Proceedings of the 12th International Conference on Human-Computer Interaction, Jul. 22, 2007, pp. 700-709.
Liu, et al., "Real Time Auto-Focus Algorithm for Eye Gaze Tracking System", In Proceedings of the International Symposium on Intelligent Signal Processing and Communication Systems, Nov. 28, 2007, pp. 742-745.
"Office Action Issued in Argentina Patent Application No. P110104752", dated Nov. 15, 2016, 7 Pages.
"Office Action Issued in Argentina Patent Application No. P110104752", dated Jun. 1, 2017, 6 Pages.
"Office Action Issued in Argentina Patent Application No. P110104752", dated Feb. 1, 2017, 8 Pages.
Pomplun, et al., "Using Pupil Size as a Measure of Cognition Workload in Video-Based Eye-Tracking Studies", In Department of Computer Science, University of Massachusetts Boston, Jan. 2009, 37 Pages.
Reale, et al., "Viewing Direction Estimation Based on 3D Eyeball Construction for HRI", In IEEE Computer Society conference on Computer Vision and Pattern Recognition Workshops, Jun. 13, 2010, pp. 24-31.
Ren, et al., "Tunable-Focus Liquid Lens Controlled Using a Servo Motor", In Optics Express, vol. 14, Issue 18, Sep. 4, 2006, pp. 8031-8036.
Rolland, et al., "Displays- Head-Mounted", In Encyclopedia of Optical Engineering, Jan. 2005, 16 Pages.
Villanueva, et al., "Geometry Issues of Gaze Estimation", In Book Advances in Human Computer Interaction , Oct. 1, 2008, pp. 513-534.
Yoneki, et al., "The Importance of Data Collection for Modelling Contact Networks", In International Conference on computational Science and Engineering, vol. 4, Aug. 29, 2009, pp. 940-943.
Zioneyez, "A Social Media Company [online]", Retrieved from: https://web.archive.org/web/20110925141157/http://www.zioneyez.com:80/notlash.php, Retrieved Date: Jun. 15, 2011, 6 Pages.

* cited by examiner

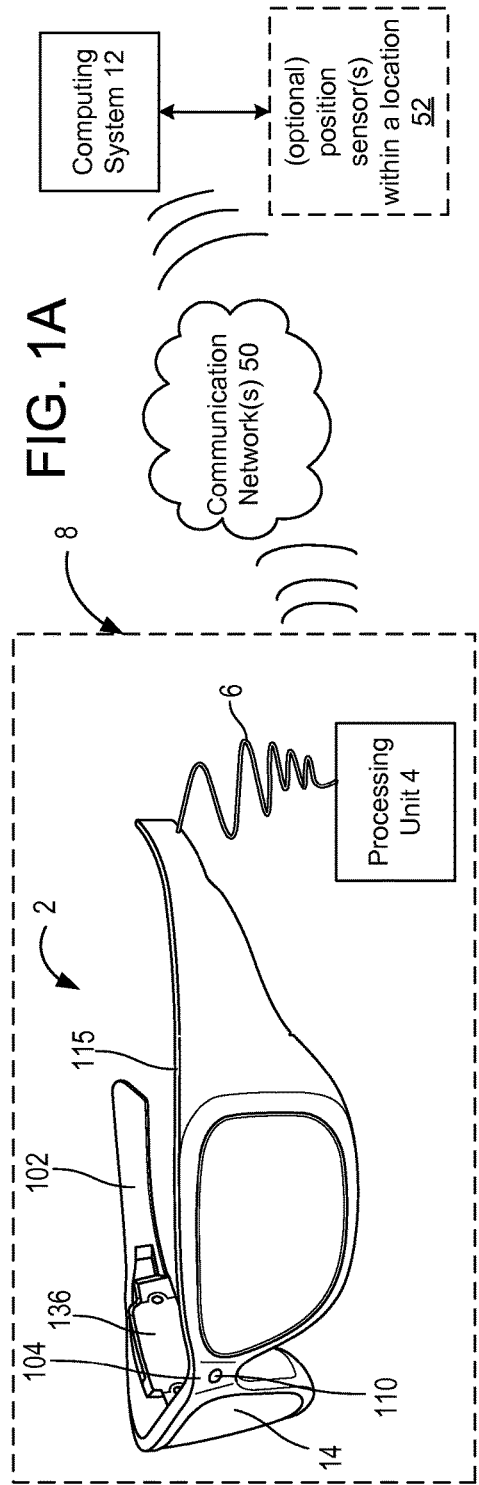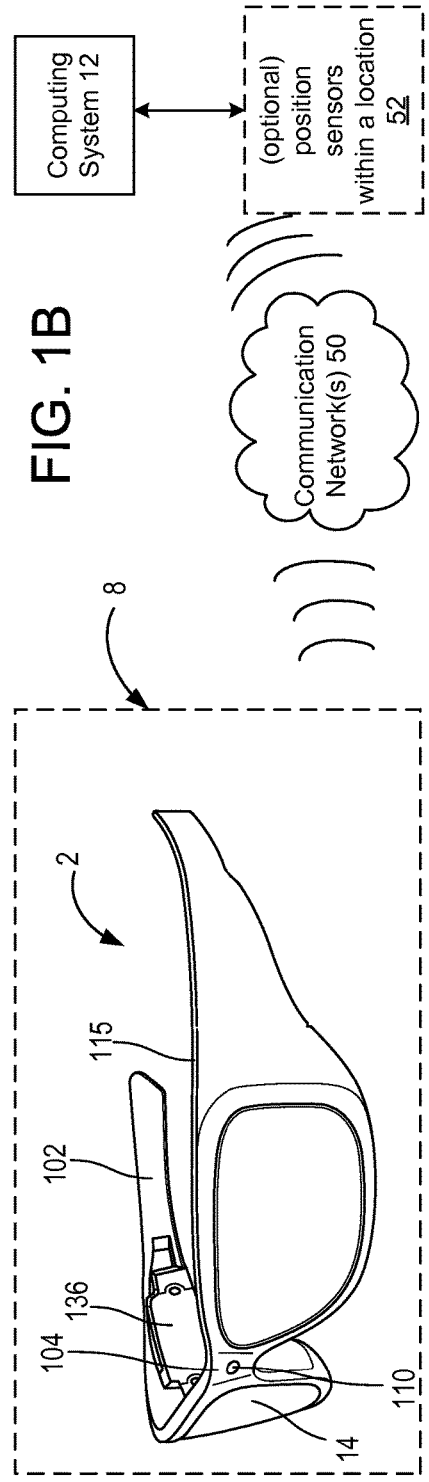

PROVIDING LOCATION OCCUPANCY ANALYSIS VIA A MIXED REALITY DEVICE

CLAIM OF PRIORITY

The present application is a continuation and claims priority of U.S. Ser. No. 13/361,923 filed Jan. 30, 2012 where the latter parent application claims priority from and as a CIP of U.S. Ser. No. 13/212,172 filed Aug. 17, 2011 entitled "CONTEXT ADAPTIVE USER INTERFACE FOR AUGMENTED REALITY DISPLAY" by Geisner et al, filed Aug. 17, 2011 and where the disclosures of both said applications are incorporated herein by reference and in their entireties.

BACKGROUND

Social networking and their varieties such as professional networking sites like Linked-In® allow people to get a sense of a person's background and connections. However, face to face connections often lead to more meaningful interactions and make impressions one does not get from reading about someone online or on paper. Then again, a person is often unaware of relevant interests and information shared with another person during a face to face conversation, or even that another person with shared interests is in the same room.

SUMMARY

Mixed reality is a technology that allows virtual imagery to be mixed with a real world view. A see-through, head mounted, mixed reality display device system, also referred to as a see-through HMD system, may be worn by a user to view real objects mixed with image data of one or more virtual objects displayed in a field of view of the display device. Often, the mixed reality device system displays three-dimensional (3D) image data, for example a 3D hologram, in addition to text and video data. The technology uses a mixed reality device system to display image data, output audio data or both which identifies one or more people in its field of view or in a same location as the user who satisfy the user's person selection criteria. An example of person selection criteria is a job position indicating the person is a hiring decision maker for a programmer position with an experience level for a certain software language. Another example of person selection criteria is all the people present in a defined location with a single marital status.

The technology provides an embodiment of one or more processor readable storage devices having instructions encoded thereon for causing one or more software controlled processors to execute a method for providing contextual personal information by a mixed reality display device system. The method comprises receiving and storing person selection criteria associated with a user wearing the mixed reality display device system. A request is sent including a location of the user and the person selection criteria to a personal information service engine, which executes on a remote computer system, for a personal identification data set for each person sharing the location and satisfying the person selection criteria. At least one personal identification data set is received from the personal identification service engine for a person sharing the location, and a determination is made as to whether the person associated with the at least one personal identification data set is in the field of view of the mixed reality display device system. Responsive to the person associated with the at least one personal identification data set being in the field of view, data is output by the display device system which identifies the person in the field of view.

The technology provides an embodiment of a method for providing contextual personal information to a user wearing a head mounted, mixed reality display device system. The method comprises receiving a request indicating a location of a user head mounted, mixed reality, display device system and person selection criteria for at least one personal identification data set for each person sharing the location and satisfying the person selection criteria. A determination is made as to whether there is a person sharing the location and satisfying the person selection criteria based on accessible user profile data. Responsive to there being a person sharing the location and satisfying the person selection criteria, generating at least one personal identification data set is generated for the person, and it is determined whether the person associated with the at least one personal identification data set is currently within a field of view of the user head mounted, mixed reality, display device system.

Responsive to the person not being currently within the field of view of the user display device system, a position of the person within the location is determined, and sent in the at least one personal identification data set. Responsive to the person being currently within the field of view of the user display device system, and the at least one personal identification data set including a personal identifier for the person in the field of view is sent to the user display device system.

The technology provides an embodiment of a system for a see-through, head mounted, mixed reality display device system for providing contextual personal information. The system comprises a see-through, mixed reality, display positioned by a head mounted support structure. An example of a support structure is a frame. At least one front facing camera is positioned on the support structure for capturing image data of a field of view of the see-through display. One or more directional sensors are attached to the support structure, and each has a sensor position with reference to a body part of the user. Each of the one or more directional sensors transmits an identity data set including the sensor position. One or more software controlled processors are communicatively coupled to the at least one front facing camera for receiving the image data of the field of view. The one or more processors also communicate with a remote computer system executing a personal information service engine. The one or more processors send a request with person selection criteria and a location of a user wearing the head mounted support structure, and receive a personal identification data set of a person sharing the location and satisfying the person selection criteria.

At least one image generation unit communicatively coupled to the one or more software controlled processors and optically coupled to the see-through, mixed reality display tracks virtual data to the person sharing the location and satisfying the person selection criteria in a field of view of the see-through display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device system.

FIG. 1B is a block diagram depicting example components of another embodiment of a see-through, mixed reality display device system.

DETAILED DESCRIPTION

Figure 1C:
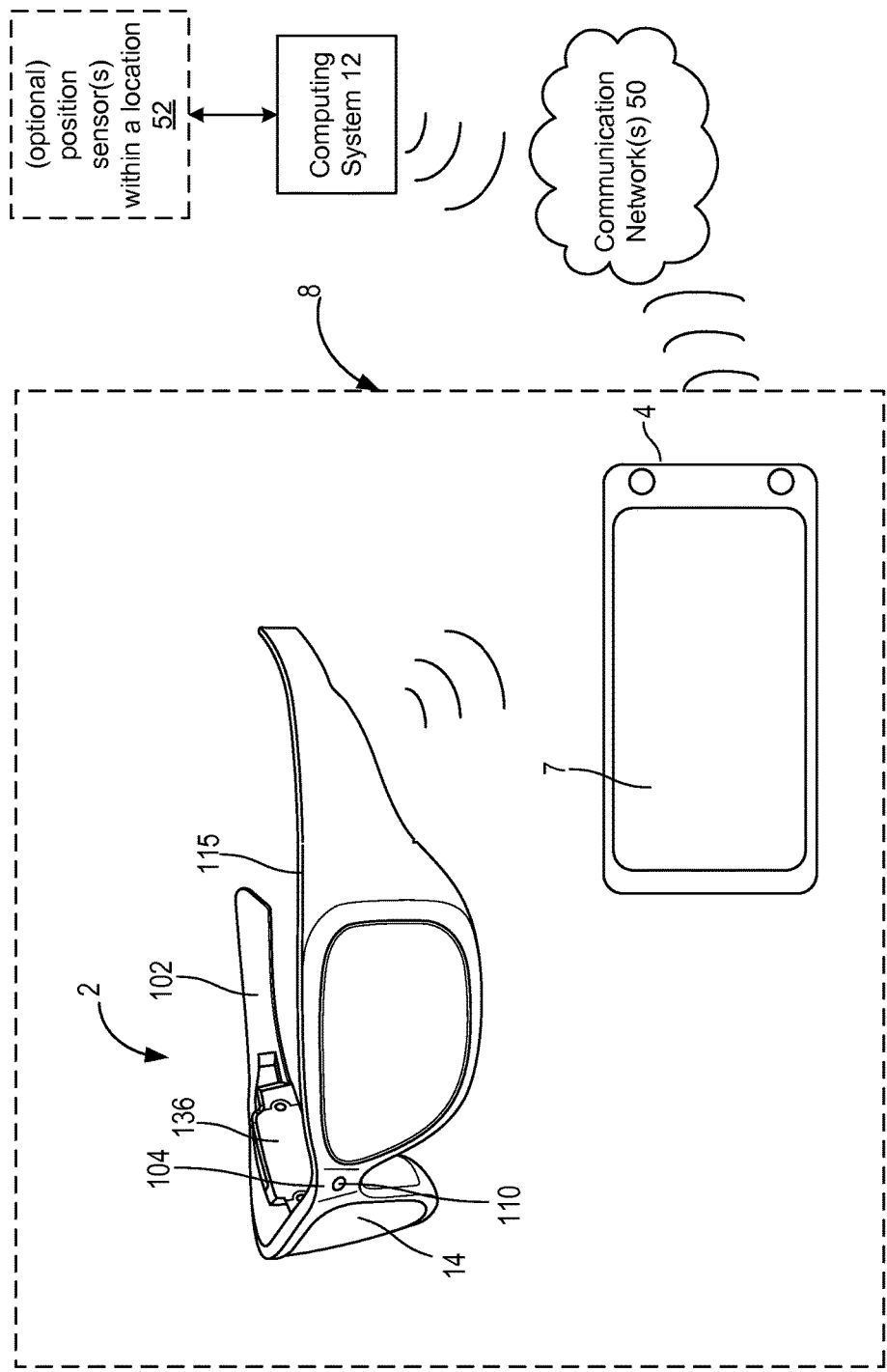
FIG. 1C is a block diagram depicting example components of another embodiment of a see-through, mixed reality display device system using a mobile device as a processing unit.

The technology provides various embodiments for providing contextual personal information by a head mounted, mixed reality display device system. A user generates selection criteria either via user input to his or her head mounted mixed reality device system or another user computing device. The user HMD outputs virtual data identifying one or more individuals or people who satisfy the criteria. For example, individuals attending an event grant permission to personal information data items either through categories or by granting access to user profile data maintained by one or more applications. The mixed reality device outputs data typically by displaying image data registered to the person when in the field of view of the user device. Audio output may also be used. A personal identifier, like a name, and a relative position to the user may be displayed for a person not in the user's device field of view. The phrase "user field of view" refers to the field of view of the display device of the user which is captured by front facing cameras on the display device as their field of view overlaps what the user sees with his or her own eyes. In some embodiments, additional cameras may be attached to the display device to provide a wider field of view, for example, a 360 degree field of view.

The technology not only identifies people within a user field of view or a wider device field of view who satisfy the criteria, but also identifies a position of a person satisfying the criteria who is outside the field of view but within the location of the user. An image mapping of a location may be available from a computer system under the control of the location. For example, a conference center may have one or more cameras, perhaps depth cameras, at different points in the location which image map the location during a conference the user is attending. An image map of a location at a certain time may also be made by image data captured from different head mounted displays in the location which is uploaded to a location modeling application. An example of such an application is Photosynth® which creates a three-dimensional model of a location. Through display device systems which cooperate to share their image data of their fields of view as well as data from non-image directional sensors, a remote personal information service engine can determine a position of a person in the location, in some instances even if the person is not wearing a head mounted, mixed reality display device system. A personal information service engine shares data of different users which subscribe to the service in accordance with their permissions. Some examples of personal information service engines are social and professional networking sites like Facebook® and LinkedIn®.

In other examples, a local version of the personal information service may be executing on a server in a location, and user can register with the local personal information service engine when in the location. A user may grant permission for use of user profile data only in the location, and only for a specific event. The server can search faster for people satisfying person selection criteria in these examples as it only searches those registered for the event.

Additionally, person to person interactions with the identified people or other people can be tracked as well. Interactions can be classified based on physical actions of the person and the user. Physical actions are natural movements of one or more body parts of a user or other person. Physical actions such as gaze, gaze duration and blinking can be detected from eye data generated by one or more eye tracking assemblies. Voice data can be detected from a microphone and sound recognition software deciphers the meaning of words spoken or sounds. A gesture is another example of a physical action, and can be detected by at least one field of view camera of the user HMD provided the gesture is performed within the field of view of the user HMD.

FIG. 1A is a block diagram depicting example components of an embodiment of a see-through, augmented or mixed reality display device system. System 8 includes a see-through display device as a head mounted display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system in place as well as a conduit for electrical connections. In this embodiment, frame 115 provides a convenient eyeglass frame as support for the elements of the system discussed further below. The frame 115 includes a nose bridge portion 104 with a microphone 110 for recording sounds and transmitting audio data to control circuitry 136 in this embodiment. A temple or side arm 102 of the frame rests on each of a user's ears. In this example, the right temple 102 includes control circuitry 136 for the display device 2.

Figure 2A:
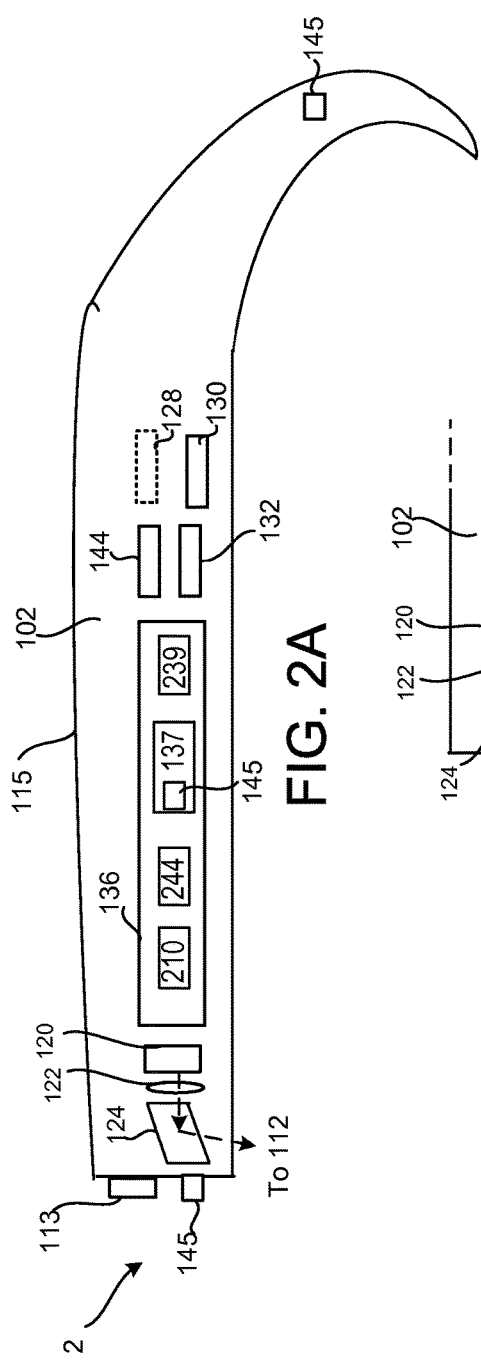
FIG. 2A is a side view of an eyeglass temple of a frame in an embodiment of the see-through, mixed reality display device embodied as eyeglasses providing support for hardware and software components.
Figure 2B:
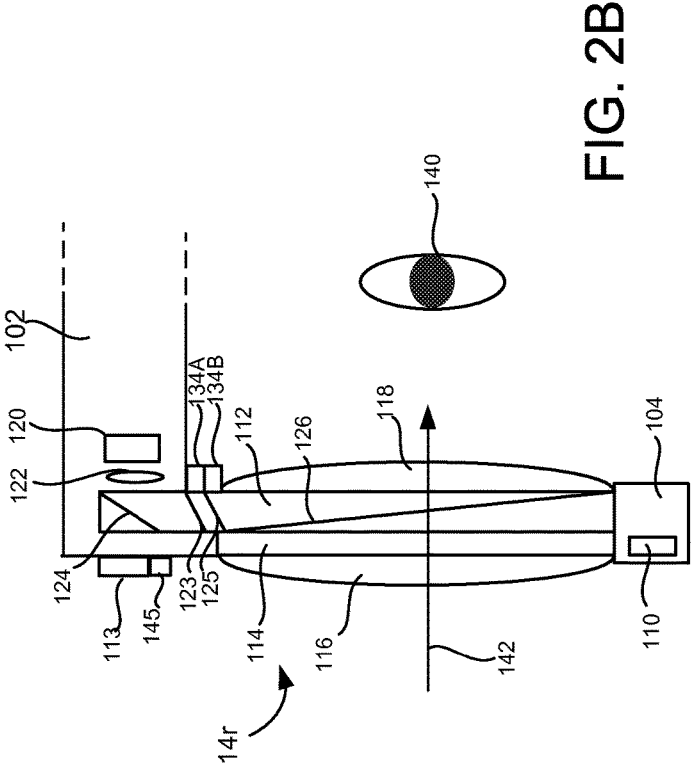
FIG. 2B is a top view of an embodiment of a display optical system of a see-through, head mounted, mixed reality device.

As illustrated in FIGS. 2A and 2B, an image generation unit 120 is included on each temple 102 in this embodiment as well. Also, not shown in this view, but illustrated in FIGS. 2A and 2B are front facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like the illustrated mobile device 4 as illustrated in FIG. 1C. The processing unit 4 may communicate wired or wirelessly (e.g., WiFi, Bluetooth, infrared, RFID transmission, wireless Universal Serial Bus (WUSB), cellular telecommunication, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B.

Figure 10:
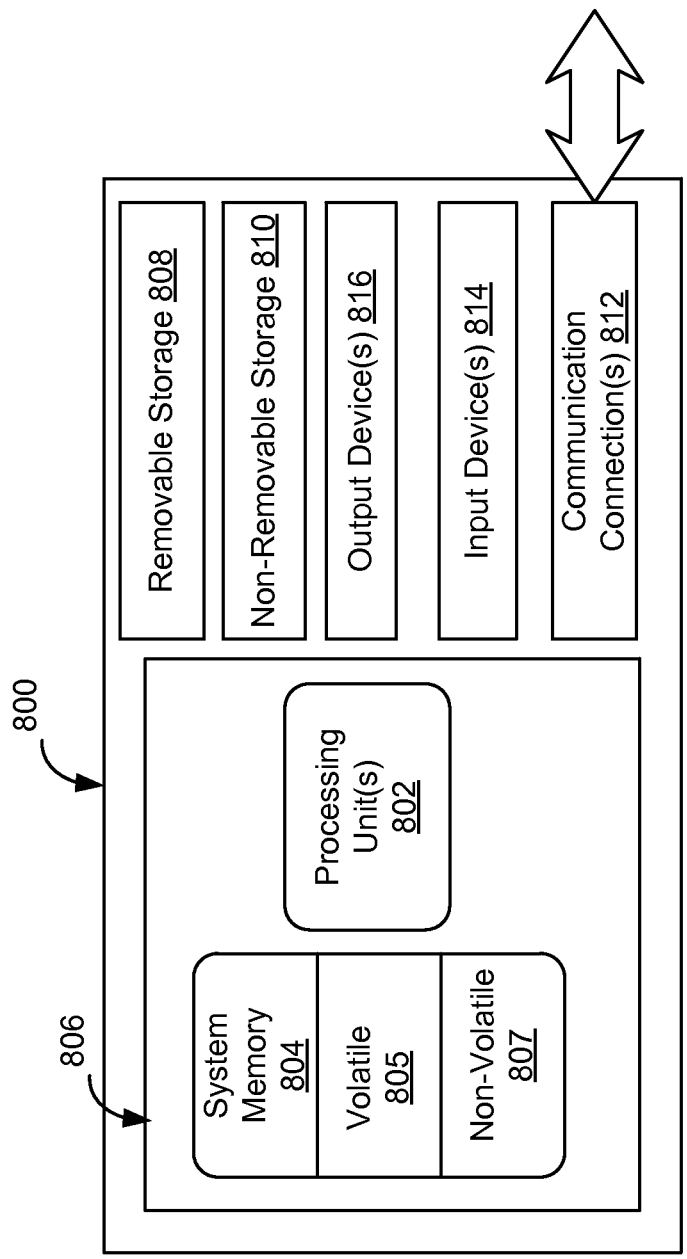
FIG. 10 is a block diagram of one embodiment of a computing system that can be used to implement a network accessible computing system.

A remote, network accessible computer system 12 may be leveraged for processing power and remote data access. An example of hardware components of a computing system 12 is shown in FIG. 10. Computing system 12 may be implemented using one or more computer systems. In these examples, the computing system 12 is also, optionally, communicatively coupled to one or more position sensors 52 within a location. Besides examples discussed below such as infrared, WUSB, RFID and directional antennas, a depth camera in a location may also be coupled for receiving three-dimensional (3D) image data of the location from which real objects and their positions in 3D can be identified.

In other examples, the one or more position sensors 52 within the location may include non-image data directional sensors such as a WiFi network access point with a directional antenna for picking up wireless signals from see-through, mixed reality display devices. The location of the WiFi access point within a building or other geographic location can be stored by the computer system 12. In some estimates, the range of a WiFi access point is about 20 to 30 meters indoors while 60 to 90 meters outdoors depending on antenna strength. Directional position sensors with smaller ranges can also be deployed in a location.

FIG. 1B is a block diagram depicting example components of another embodiment of a see-through, augmented or mixed reality display device system 8 which may communicate over a communication network 50 with other devices. In this embodiment, the control circuitry 136 of the display device 2 communicates wirelessly via a wireless transceiver (see 137 in FIG. 2A) over a communication network 50 to one or more computer systems 12.

FIG. 1C is a block diagram of another embodiment of a see-through, mixed reality display device system 8 using a mobile device as a processing unit 4. Examples of hardware and software components of a mobile device 4 such as may be embodied in a smart phone or tablet computing device are described in FIG. 1C. A display 7 of the mobile device 4 may also display data, for example menus, for executing applications and be touch sensitive for accepting user input. Some other examples of mobile devices 4 are a laptop or notebook computer, and a netbook computer.

FIG. 2A is a side view of an eyeglass temple 102 of the frame 115 in an embodiment of the see-through, mixed reality display device 2 embodied as eyeglasses providing support for hardware and software components. At the front of frame 115 is physical environment facing video camera 113 that can capture video and still images of the real world to map real objects in the field of view of the see-through display, and hence, in the field of view of the user. The cameras are also referred to as front facing cameras. Each front facing camera 113 is calibrated with respect to a reference point of its respective display optical system 14 such that the field of view of the display optical system 14 can be determined from the image data captured by the respective camera 113. One example of such a reference point is an optical axis (see 142 in FIG. 2B) of its respective display optical system 14. The image data is typically color image data.

In many embodiments, the two cameras 113 provide overlapping image data from which depth information for objects in the scene may be determined based on stereopsis. In some examples, the cameras may also be depth sensitive cameras which transmit and detect infrared light from which depth data may be determined. The processing identifies and maps the user's real world field of view. Some examples of depth sensing technologies that may be included on the head mounted display device 2 without limitation, are SONAR, LIDAR, Structured Light, and/or Time of Flight.

Control circuits 136 provide various electronics that support the other components of head mounted display device 2. In this example, the right temple 102 includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU).

In some examples, the wireless interface 137 includes a directional antenna 145 which can act as a directional relative position sensor. When an identity data set, which may include, for example, a device identifier, a time stamp and a personal identifier of a logged in user, from another display device system 8 or another computing system like a mobile device is received, the processing unit 210 can determine a relative position of the transmitting device and the person identified in the identity data set because of the directional antenna 145. The time stamp is a basis for identifying a current position of the person being sought.

Inside, or mounted to temple 102, are ear phones 130, inertial sensors 132, one or more location sensors 144 and directional relative position sensors 145 at different positions on the temple 102. An example of a location sensor is a Global Positioning System (GPS) device which can provide location information independent of using the display system 8 as a reference. GPS and wireless transceivers like transceiver 137 can provide detection for ranges of about 10 or more meters. However, in a crowded room, more precision may be desirable.

In many examples, a directional position sensor is a wireless device, like a receiver or transceiver, which detects a wireless signal from another mixed reality device or computing device and typically also transmits a wireless signal. Some examples of directional position sensors 145 are an infrared (IR) device, a WUSB transceiver, a Bluetooth device or a radio frequency device for processing RFID data. In the embodiment of FIG. 2A, the placement of the detection areas of the sensors 145 with respect to the temple 102 indicates from which direction with respect to the temple a sensor has received a signal. Assuming a user is wearing the display device 2, the direction is assumed to be with respect to the user's head. For example, a signal received at the sensor in the middle of the right temple is determined to be from a device on the right side of the user's head. In other embodiments, a body part reference other than the head may be used. The signal range set for the sensor provides an approximate distance boundary within which is positioned a detected display or mobile device from the user's display device 2.

For example, a wireless universal serial bus (WUSB) device may form a wireless connection with a mixed reality display device system 8 within approximately three to ten meters. Bluetooth may also be used and form wireless connections with other Bluetooth devices at a distance of about 1 meter if desired or much higher such as 100 meters depending on the version of Bluetooth used and signal power used. For distances of less than a meter such as for a space about a person or a particular object, infrared signals may be used to exchange data for example using Infrared Data Association (IrDA) communication protocols. Depending on the implementing technology, RFID technology can provide different detection distances as well. For example, some RFID technology can detect an object from less than a few centimeters while other technology can detect an object within 60 feet. As described further in the figures below, non-image data from these directional sensors can be processed much quicker than image data and can reduce time for finding a position of a person.

Optional electrical impulse sensor 128 detects commands via eye movements. In one embodiment, inertial sensors 132 include a three axis magnetometer 132A, three axis gyro 132B and three axis accelerometer 132C. The inertial sensors are for sensing position, orientation, and sudden accelerations of head mounted display device 2. From these movements, head position with respect to the ground may also be determined. In this embodiment, each of the devices using an analog signal in its operation like the sensor devices 144, 145, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes microdisplay 120 for projecting images of one or more virtual objects and coupling optics lens system 122 for directing images from microdisplay 120 to reflecting surface or element 124. The microdisplay 120 may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the microdisplay 120 into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

FIG. 2B is a top view of an embodiment of one side of a see-through, head mounted, mixed reality display device including a display optical system 14. A portion of the frame 115 of the head mounted display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system includes a light guide optical element 112, opacity filter 114, and optional see-through lens 116 and see-through lens 118.

Light guide optical element 112 transmits light from microdisplay 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from microdisplay 120. Light from microdisplay 120 passes through lens or lens system 122 and becomes incident on reflecting surface 124. The reflecting surface 124 reflects the incident light from the microdisplay 120 such that light is trapped inside a waveguide, a planar waveguide in this embodiment. A representative reflecting element 126 represents the one or more optical elements like mirrors, gratings, and other optical elements which direct visible light representing an image from the planar waveguide towards the user eye 140.

Opacity filter 114, which is aligned with light guide optical element 112, selectively blocks natural light from passing through light guide optical element 112 for enhancing contrast of virtual imagery. More details of an opacity filter are provided in U.S. patent application Ser. No. 12/887, 426, "Opacity Filter For See-Through Mounted Display," filed on Sep. 21, 2010, incorporated herein by reference in its entirety.

The position of the user's eyes and image data of the eye in general may be used for applications such as gaze detection, and blink command detection. The eye tracking system 134 comprises an eye tracking illumination source 134A, e.g. LED or laser, emitting about a predetermined IR wavelength and an eye tracking IR sensor 134B, e.g. IR camera or IR position sensitive glint detector (PSD), positioned between lens 118 and temple 102 in this example.

In this embodiment, a wavelength selective filter 123 passes through visible spectrum light from the reflecting surface 124 and directs the infrared wavelength illumination from the eye tracking illumination source 134A into the light guide optical element 112, e.g. a planar waveguide, through wavelength selective filter 125 in a direction heading toward the nose bridge 104. Reflective element 126 in this example is also representative of one or more optical elements which implement bidirectional infrared filtering which directs IR illumination towards the eye 140, preferably centered about the optical axis 142 and receives IR reflections from the user eye 140. The IR sensor 134B is also optically coupled to the wavelength selective filter 125 which directs only infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See *Control your mobile music with eyeball-activated earphones*!, Feb. 19, 2010, http://www-.wirefresh.com/control-your-mobile-music-with-eyeball-actvated-headphones, which is hereby incorporated by reference.) Eye blinks may be tracked as commands. Other embodiments for tracking eyes movements such as blinks which are based on pattern and motion recognition in image data from the small eye tracking camera 134B mounted on the inside of the glasses, can also be used. The eye tracking camera 134B sends buffers of image data to the memory 244 under control of the control circuitry 136.

Again, FIGS. 2A and 2B only show half of the head mounted display device 2. A full head mounted display device would include another set of optional see-through lenses 116 and 118, another opacity filter 114, another light guide optical element 112, another microdisplay 120, another lens system 122 front facing camera 113, eye tracking assembly 134, earphones 130, directional sensors 145, and sensors 128 if present. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3:
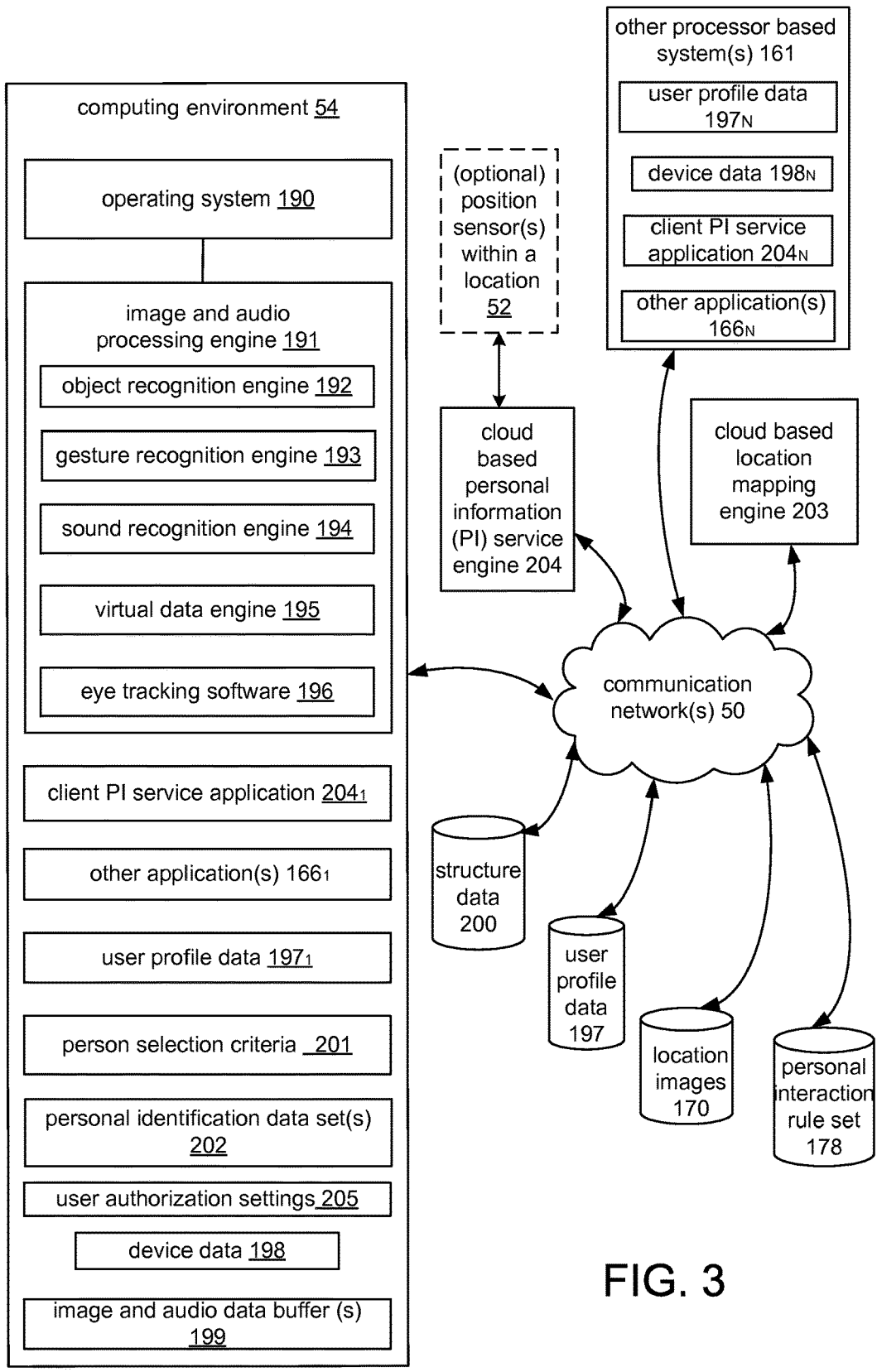
FIG. 3 is a block diagram of a system from a software perspective for providing contextual personal information via a see-through, mixed reality display device system.

FIG. 3 illustrates a computing environment embodiment from a software perspective which may be implemented by the display device system 8, a remote computing system 12 in communication with the display device system 8 or both. Network connectivity allows leveraging of available computing resources. The computing environment 54 may be implemented using one or more computer systems. As shown in the embodiment of FIG. 3, the software components of a computing environment 54 include an image and audio processing engine 191 in communication with an operating system 190. Image and audio processing engine 191 includes object recognition engine 192, gesture recognition engine 193, sound recognition engine 194, virtual data engine 195, and eye tracking software 196, all in communication with each other. Image and audio processing engine 191 processes video, image, and audio data received from a capture device such as the front facing cameras 113, other cameras on the display device (not shown) or optional cameras 52, e.g. depth cameras, in the location. To assist in the detection and/or tracking of objects, an object recognition engine 192 of the image and audio processing engine 191 may access one or more databases of structure data 200 over one or more communication networks 50.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic. A virtual object position may be registered or dependent on a position of a corresponding real object. The virtual data engine 195 determines the position of image data of a virtual object in display coordinates for each display optical system 14. The virtual data engine 195 may also determine the position of virtual objects in various maps of a real-world environment stored in a memory unit of the display device system 8 or of the computing system 12. One map may be the field of view of the display device with respect to one or more reference points for approximating the locations of the user's eyes. For example, the optical axes of the see-through display optical systems 14 may be used as such reference points. In other examples, the real-world environment map may be independent of the display device, e.g. a 3D map or model of a location (e.g. store, coffee shop, museum).

One or more processors of the computing system 12, or the display device system 8 or both also execute the object recognition engine 192 to identify real objects in image data captured by the environment facing cameras 113 or other cameras 52 in the location. As in other image processing applications, a person can be a type of object. For example, the object recognition engine 192 may implement pattern recognition based on structure data 200 to detect particular objects including a human. The object recognition engine 192 may also include facial recognition software which is used to detect the face of a particular person.

Structure data 200 may include structural information about targets and/or objects to be tracked. For example, a skeletal model of a human may be stored to help recognize body parts. In another example, structure data 200 may include structural information regarding one or more inanimate objects in order to help recognize the one or more inanimate objects. The structure data 200 may store structural information as image data or use image data as references for pattern recognition. The image data may also be used for facial recognition. The structure data 200 may include one or more image datastores including images of numbers, symbols (e.g. mathematical symbols), letters and characters from alphabets used by different languages.

In this embodiment, there is a cloud based location mapping engine 203 which generates a model or map of a location in three dimensions based on image data. It may store and access location images 170 using location data, e.g. GPS data from GPS device 144, as an index. An example of such a mapping engine 203 is Photosynth®. Cameras 52 in the location or front facing cameras 113 and any other cameras on the support structures of one or more HMD display systems 8 in the location can upload their image data to the mapping engine 203. A mapping engine 203, which can process depth data or create stereo images from the image data captured by cameras 113 and any other cameras on the support structure, can create a three dimensional model of a location which tracks stationary and moving objects in the location based on local object recognition by each display device system 8 of objects within its respective field of view. The mapping engine 203 can assign object identifiers to the objects for use by the mixed reality, display device systems 8 in the location.

Upon detection of one or more objects by the object recognition engine 192, image and audio processing engine 191 may report to operating system 190 an identification of each object detected and a corresponding position and/or orientation which the operating system 190 passes along to an application like the client personal information (PI) service application $204_1$.

The sound recognition engine 194 processes audio received via microphone 110.

The front facing cameras 113 in conjunction with the gesture recognition engine 193 implement a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user which may indicate a control or command to an executing application. For example, an exchange of hand waves indicate a personal interaction of greeting to the personal information service engine or application 204 as discussed below. The action may be performed by a body part of a user, e.g. a hand or finger, but also an eye blink sequence of an eye can be gestures. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

In some examples, matching of image data to image models of a user's hand or finger during gesture training sessions may be used rather than skeletal tracking for recognizing gestures.

Also illustrated are a personal interaction rule set 178 which contains rules for use by the PI service application 204, $204_1$ in categorizing an interaction as discussed further below.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data in image and audio data buffer(s) 199. The buffers provide memory for receiving image data captured from the front facing cameras 113, image data from an eye tracking camera 134B of an eye tracking assembly 134 if used, buffers for holding image data of virtual objects to be displayed by the image generation units 120, and buffers for audio data such as voice commands from the user via microphone 110 and instructions to be sent to the user via earphones 130.

Device data 198 may include a unique identifier for the computer system 8, a network address, e.g. an IP address, model number, configuration parameters such as devices installed, identification of the operation system, and what applications are available in the display device system 8 and are executing in the display system 8 etc. Particularly for the see-through, mixed reality display device system 8, the device data may also include data from sensors or determined from the sensors like the directional position sensors 145, the orientation sensors 132, the temperature sensor 138, the microphone 110, the electrical impulse sensor 128 if present, and the one or more location sensors 144.

In this embodiment, the display device system 8 and other processor based systems 161 used by the user execute a client side version of a personal information service application $204_N$ which communicates over a communication network 50 with a personal information (PI) service engine or application 204 which is cloud based in this embodiment. A cloud based engine may include one or more software application instantiations which execute on and store data by one or more networked computer systems. The engine is not tied to a particular location. Some examples of cloud based software are social networking sites like Facebook® and LinkedIn® and web-based email sites like Yahoo! ® and Hotmail®. A user may register an account with the personal information service engine 204 which grants the personal information service permission to monitor the user's executing applications and data generated and received by them which is stored in user profile data 197, and device data 198 for tracking the user's location and device capabilities. Based on the user profile data aggregated from the user's systems 8, 161, the data received and sent by the executing applications on systems 8, 161 used by the user and stored in user profile data, and location and directional position sensor data stored in device data $198_1$, $198_N$, the personal information service 204 can determine where the user is located and where other devices of users matching the user's criteria are positioned within the location.

The local copies of the user profile data $197_1$, $197_N$ may store some of the same user profile data 197 and may periodically update their local copies with the user profile data stored by the computer system 12 in an accessible database 197 over a communication network 50. Some examples of user profile data 197 are the user's expressed preferences, the user's friends' list or more generally identification data for other people having a stored relationship link to the user, the user's resume, the user's profession, family members, contacts, the user's preferred activities, the user's favorites, some examples of which are, favorite color, favorite foods, favorite books, favorite author, etc., a list of the user's reminders, the user's social groups, the user's current location, and other user created content, such as the user's photos, images, field of view image data captured by the front facing cameras, recorded videos and other user-specific information. In one embodiment, user profile data may include data obtained from one or more data sources or applications such as a user's social networking sites, contacts or address book, schedule data from a calendar application, email data, instant messaging data, or other sources on the Internet as well as data directly entered by the user. Trust levels may be determined by user profile data 197 which identifies people known to the user, for example as social networking friends and family members sharing the same gaming service, or as employees in the same office which may be subdivided into different groups based on trust levels. Additionally, the user may explicitly identify trust levels in their user profile data 197 using the client side PI service application $204_N$. In one embodiment, the cloud based personal information service engine 204 aggregates data from user profile data $197_N$ stored on the different user computer systems 8, 161 of the user.

Each version of the personal information service application 204 also stores in user profile data 197 a tracking history of the user. Some examples of events, people and things tracked in the tracking history are locations visited, transactions, content and real things purchased, field of view history, and people detected with whom the user has interacted. If electronically identified friends (e.g. social networking friends) are registered with the personal information service engine 204 too, or they make information available to the user or publicly through other applications 166, the personal information service engine 204 can use this data as well to track the content and context of the user.

As previously mentioned, instead of a cloud based personal information service engine, the engine can 204 can operate on a server dedicated for a certain entity or location. A user can register for an event at a location, such as a conference center, and create a user profile with information he wants made available for the event only. Different authorization settings 205 may be set identifying who may see the information. For example, permission or authorization settings categories may be conference specific ones like employers or vendors. They may also be more general ones like those on my friends list or LinkedIn® contacts.

Also illustrated in this embodiment of the computing environment 54, one or more person selection criteria 201 may have been received and stored based on user input and one or more personal identification data sets 202 associated with people who satisfy the personal selection criteria may, at least temporarily, be stored in memory. Person selection criteria 201 generally relate to one or more characteristics, relationships, interests or experiences of a person, and user profile data is searched for data indicating a match, within a criteria such as that a commonly accessible search engine (Google®, Yahoo®) may use, with these characteristics, relationships, interests and experiences is searched to identify a person satisfying the criteria. A characteristic can be a physical characteristic such as height and gender. Characteristics may also be non-physical in nature such as social, political, religious, economic and employment related characteristics like an occupation. User profile data can identify relationships with other people, organizations, and things both concrete e.g. car ownership, and abstract. Some examples of interest are hobbies and fields of knowledge such as an interest in the latest discoveries about the universe. Experiences can cover a wide range of life experiences from the practical such as work related experience to fun ones such as travel.

In some examples, the personal information service engine 204 identifies people in the location having a relationship link in the user profile data of the user, for example people who are on the user's friends list or contacts folder, and is able to search their user profile data for data satisfying the person selection criteria in accordance with the access the related people, e.g. the friends, have granted the user. For example, if the user named Bob is in a first friend category for a person named Pete who allows access to his resume only for those in the first friend category, the engine 204 can search the resume for data satisfying the person selection criteria of Bob. However, the engine 204 would not provide data from Pete's resume as data satisfying the person selection criteria of either Sue, who is in a second, less restrictive friend category, or Lee, who would qualify as being in a category which the general public can access.

Pete has not allowed access to his resume Sue who is in a second friend category which searching user profile data of one or more persons having a relationship link in the user profile data of the user for data which satisfies the person selection criteria and for which the user has been permitted or authorized access Some examples of data fields which may be included in a personal identification data set 202 are a personal identifier like a name, a personal information data item which satisfies the person selection criteria, and a position with respect to the user. An example of a personal information data item is a section from a resume about one's Java experience which corresponds to person selection criteria for five years of experience programming in Java. A personal identifier may also include an object identifier associated with the person from image data of the location. Position data may also include a relative position in terms of a direction and a distance range of the person from the user.

User authorization settings 205 identify what the user has granted permission for the personal information service engine 204 to share. For example, a participant may allow certain personal information items to be shared at work or with certain people. Authorizations can also be set based on location. A user may set that he or she does not wish to share his or her field of view data or his or her name as a personal identifier in identity data sets. The PI service engine 204 can use an alphanumeric code as an object identifier for the person instead. The code may also be encrypted for further privacy. In this way, the PI service engine 204 and the location mapping engine 203 can track the user's location with data received from devices in the location while not sharing identity data with such devices, while not sharing identity data with other devices in the location.

Embodiments of methods for the technology and example implementation processes for some of the steps of the methods are presented in figures below. For illustrative purposes, the method embodiments below are described in the context of the system embodiments described above. However, the method embodiments are not limited to operating in the system embodiments described above and may be implemented in other system embodiments.

Figure 4:
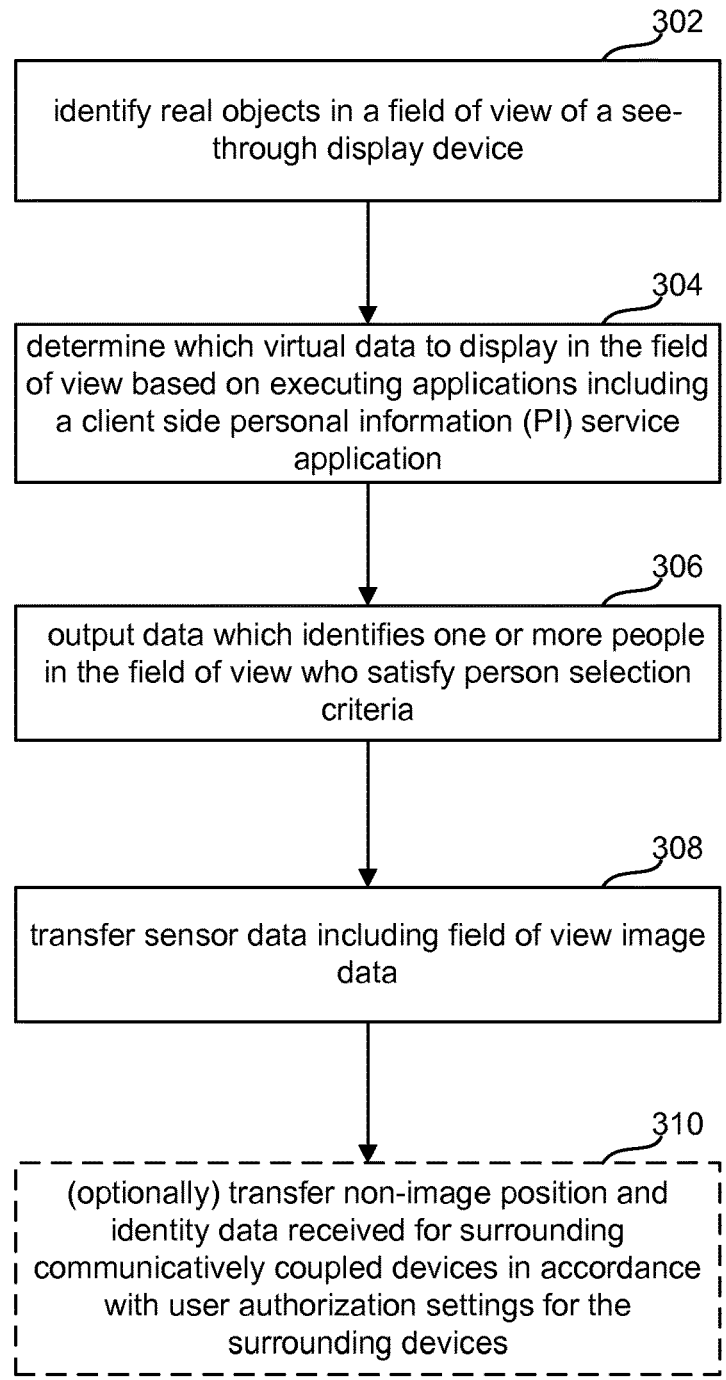
FIG. 4 is a flowchart of an embodiment of a method of operation of a mixed reality display device system which provides contextual personal information.

FIG. 4 is a flowchart of an embodiment of a method of operation of a mixed reality display device system 8 which provides contextual personal information. In step 302, the display device system 8 identifies real objects in a field of view of its see-through display device, and in step 304, which virtual data to display in the field of view by the one or more image generation units 120 is determined based on executing applications including a client side personal information (PI) service application $204_1$. In step 306, the processing unit 210 under control of the client side PI service application $204_1$ outputs data which identifies one or more people in the field of view who satisfy person selection criteria. In some examples, the outputted data may be a visual indicator registered to the one or more people. As part of contributing to the 3D image mapping of the location, in step 308, the display device system 8 transfers sensor data including field of view image data to the location mapping engine 203, and optionally, in step 310, transfers non-image position and identity data received for surrounding communicatively coupled devices in accordance with user authorization settings for the surrounding devices. The non-image position data is directional position data when received by directional sensors 145 of the display device system 8. The steps of FIG. 4 are continuously performed as the display device system 8 is operating and is executing the PI service engine $204_1$.

Similarly, the processing examples of FIGS. 5 through 8 are continuously performed resulting in updates of personal identification data sets and new generation of new data sets as people leave and enter the location or as criteria changes based on user input.

In some instances, the user may select a focus identification mode instead of a field of view identification mode for example as user input during the initialization of the client side application $204_1$ or via voice or gesture commands during execution of the application $204_1$. In a focus identification mode, data which identifies a person satisfying the personal information selection criteria is displayed when such a person is an object of focus rather than simply being in the field of view. A user may select this mode to avoid visual clutter. An object of focus may be identified as the point of gaze which is determined by the eye tracking software 196 based on image data of the eyes received from the eye tracking assemblies 134. In a field of view identification mode, any person satisfying the person selection criteria within the field of view of the user's head mounted, mixed reality, display device system has identifying data such as a visual indicator registered to the person, even if another person or object is the user object of focus.

Figure 5:
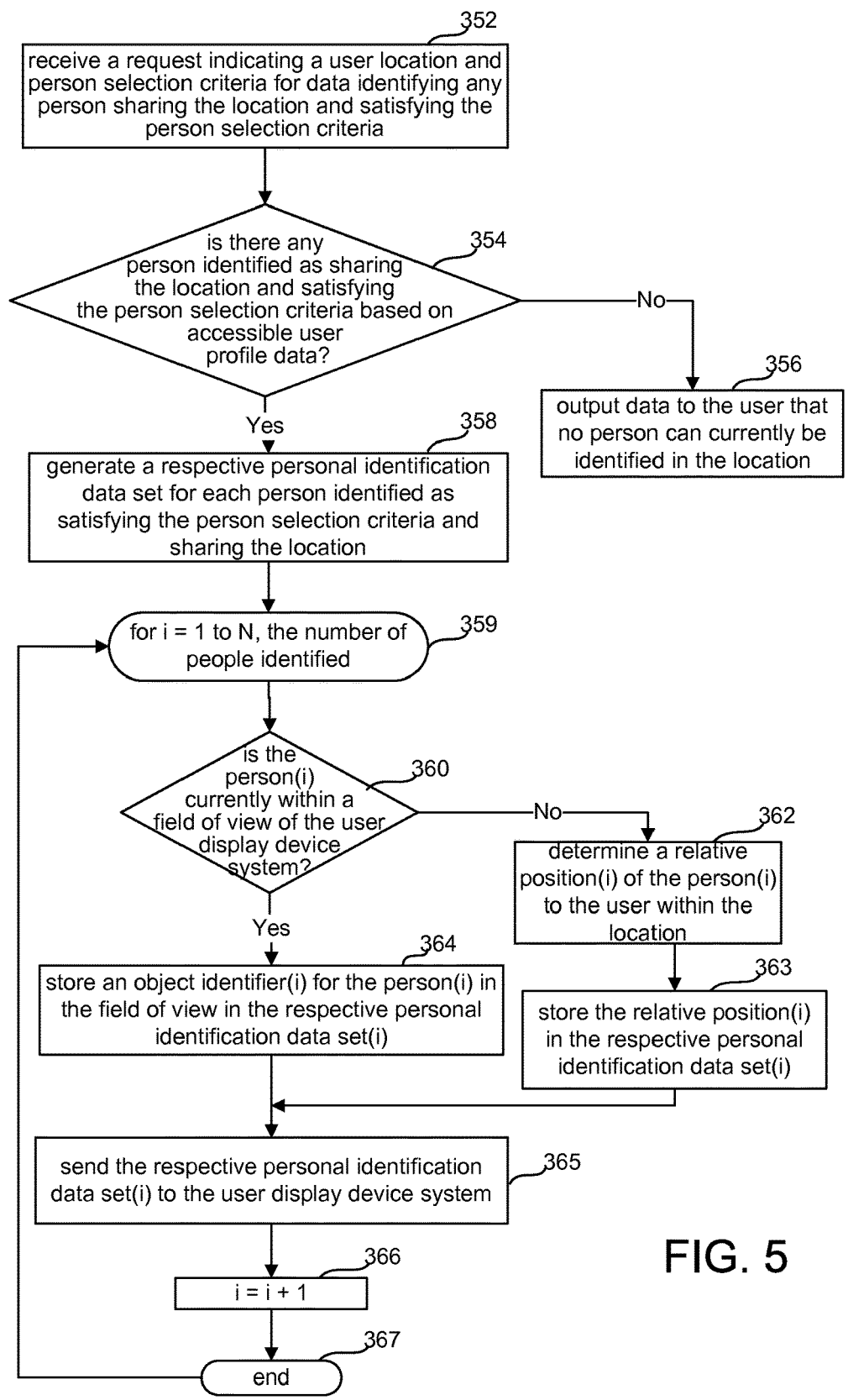
FIG. 5 is a flowchart of an embodiment of a method for providing contextual personal information to a mixed reality display device system.

FIG. 5 is a flowchart of an embodiment of a method for providing contextual personal information to a mixed reality display device system. For illustrative purposes, the embodiment of FIG. 5 is discussed in the context of being performed by a cloud based personal information service engine or application 204. In step 352, a request for data identifying any person sharing the location and satisfying person selection criteria is received from a user head mounted, mixed reality display device system, and the request indicates a user location and the person selection criteria. The user location data may be GPS data identifying a location, for example. It may also be image data of the user in an image mapped location for which location data is known. Some examples of a location may be a school, a company building, a hotel, a conference center or an outdoor recreational facility. In step 354, it is determined whether there is any person identified as sharing the location and satisfying the person selection criteria based on accessible user profile data, e.g. the aggregated user profile data 197 of users with accounts to the PI service engine 204.

For example, a current GPS location for people in the location may be stored in their respective user profile data accessible by the PI service engine 204, and this location data can be compared with the GPS data of the user to determine whether they share the same location. In other examples, image data of people in the location captured by other display device systems 8 or positional cameras 52 in the location may be used to identify people based on facial recognition compared with image data stored in or accessible by their user profile data. In the case of a person having a relationship link defined and stored in the user profile data, e.g. a friend, if GPS data is not available or not available at a refined enough level, the PI service engine 204 can search the person's user profile data and identify the person's location from data stored in the person's user profile data like a post on Foursquare® or Facebook® or a tweet on Twitter® indicating her current location. As described above, the user profile data of the people in the location registered with the PI service engine 204 and public information accessible for anyone identified in the location can be searched for matches within a criteria with the person selection criteria.

There may be people in the location who satisfy the person selection criteria, but if their privacy or user authorization settings 205 do not allow their data to be accessed or shared, such people cannot be identified in the location.

If such a person is not identified or user authorization settings for such a person do not allow him or her to be identified, at least for the personal information related to the person selection criteria, then in step 356, the cloud based PI service engine 204 outputs data to the user that no person can currently be identified in the location.

In step 358, the PI engine 204 generates a respective personal identification data set for each person identified as satisfying the person selection criteria and sharing the location. An illustrative loop structure is used to show the processing of determining which of the people identified are within the user field of view and which are outside of the field of view and the processing based on the result of the determining step. In step 359, a loop counter, i, is initialized to begin processing of the people identified as sharing the user location and satisfying the person selection criteria. In step 360, the PI service engine 204 determines whether the person(i) is currently within a field of view of the user mixed reality, display device system based on received field of view data. In step 362, responsive to the person(i) not being currently within the field of view of the user display device system, the PI service engine 204 determines a relative position(i) of the person(i) to the user within the location, and stores in step 363 the relative position(i) in the respective personal identification data set(i). In step 364, responsive to the person being currently within the field of view of the user display device system, the PI service engine 204 stores an object identifier(i) for the person(i) in the field of view in the respective personal identification data set(i).

Whether the person(i) is in the field of view or not, the PI service engine 204 sends in step 365 the respective personal identification data set(i) to the user display device system. The counter, i, is incremented in step 366, and if it does not exceed N representing the number of people in the location who satisfy the person selection criteria, the loop repeats at 359 for another identified person. When the counter, i, exceeds N, the loop ends at step 367.

Figure 6:
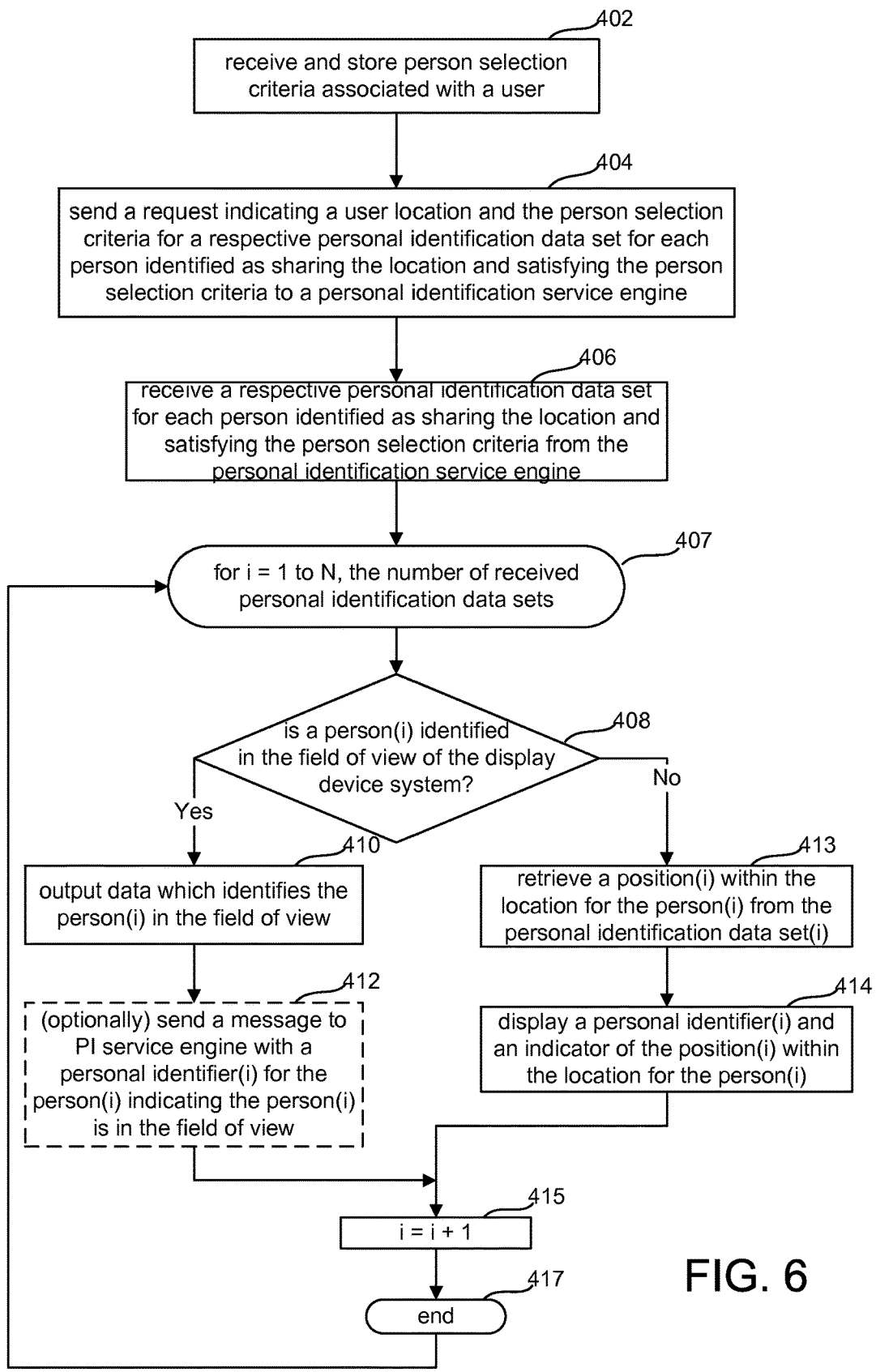
FIG. 6 is a flowchart of an embodiment of a method for providing contextual personal information by a head mounted, mixed reality display device system.

FIG. 6 is a flowchart of an embodiment of a method for providing contextual personal information by a head mounted, mixed reality display device system. The client PI application 204$_1$ in step 402 receives and stores person selection criteria associated with a user. The user may have set up criteria which applies in any environment or location via a previous online session which has been stored by the cloud based side 204 of the PI engine. The display device system 8 downloads the person criteria and stores locally. In other examples, person selection criteria is received locally, for example via input to the processing unit 4 or via physical action user input. A user may for example say, please identify all the single people at a concert event, and the client side 204$_1$ of the PI application sends the criteria to the cloud based side, and receives and displays identifying data for any person identified who satisfies the criteria in the field of view.

In line with the example just mentioned, in step 404, the PI engine 204$_1$ sends a request indicating a user location and the person selection criteria for a respective personal identification data set for each person identified as sharing the location and satisfying the person selection criteria to a personal identification service engine like the cloud based personal identification service application or engine 204. In step 406, a respective personal identification data set for each person identified as sharing the location and satisfying the person selection criteria from the personal identification service engine is received.

An illustrative loop structure is used to show the processing of determining which of the people identified are within the user field of view and which are outside of the field of view and the processing based on the result of the determining step. In step 407, a loop counter, i, is initialized to begin processing of the number of personal identification data sets N which have been received.

In step 408, the PI application 204$_1$ interfaces with the object recognition software 192 for determining whether a person(i) associated with and identified by a personal identifier(i) in a respective personal identification data set(i) is identified in the field of view of the display device system. For example, facial recognition software of the object recognition software 192 may be applied to person objects in the field of view for identifying the person(i). Additionally, non-image directional position data from surrounding devices may identify the person(i) is in the field of view, for example the back of the head of the person(i) may be right in front of the user.

If the person(i) is not identified in the field of view of the user's device, in step 413, the PI application 204$_1$ retrieves a position(i) within the location for the person(i) from the personal identification data set(i), and in step 414 causes the image generation unit 120 to display the personal identifier (i) and an indicator of the position(i) within the location for the person(i). Some examples of the indicator of the position (i) may be one or more directional symbols, directions in text or images, or a place identifier, and particularly the last one if the location is one the user tracking history in user profile data 197 indicates the user has visited a number of times or for an extended period of time.

Responsive to the person(i) associated with the respective personal identification data set(i) being identified in the field of view, in step 410, the PI application 204$_1$ causes the image generation unit 120 to output data which identifies the person(i) in the field of view. Some examples of such data are a visual effect like highlighting, the text, image data, or video data, whether two dimensional or 3D included as a personal information item in the personal identification data set(i). In other examples, the data output which identifies the person(i) in the field of view is self-selected image data included in the personal information item or another data item in the personal identification data set which the person (i) has designated to be displayed to identify him or her. An example of such self-selected image data is a hologram registered to the person(i) in the field of view. An example of a hologram may be an avatar which overlays the person (i).

In a different embodiment with a device system which includes cameras beside front facing cameras, image data from a non-front facing camera having person(i) recognized in its field of view may be displayed in the mixed reality see-through display with visual data identifying the person in the image data. Optionally, in step 412, the client side PI application 204$_1$ sends a message to the cloud based PI service engine 204 with the personal identifier(i) stored in the data set(i) for the person(i) indicating the person(i) is in the field of view.

The counter, i, is incremented in step 415, and if it does not exceed N representing the number of received personal identification data sets, the loop repeats at 407 for another identified person. When the counter, i, exceeds N, the loop ends at step 417.

Figure 7A:
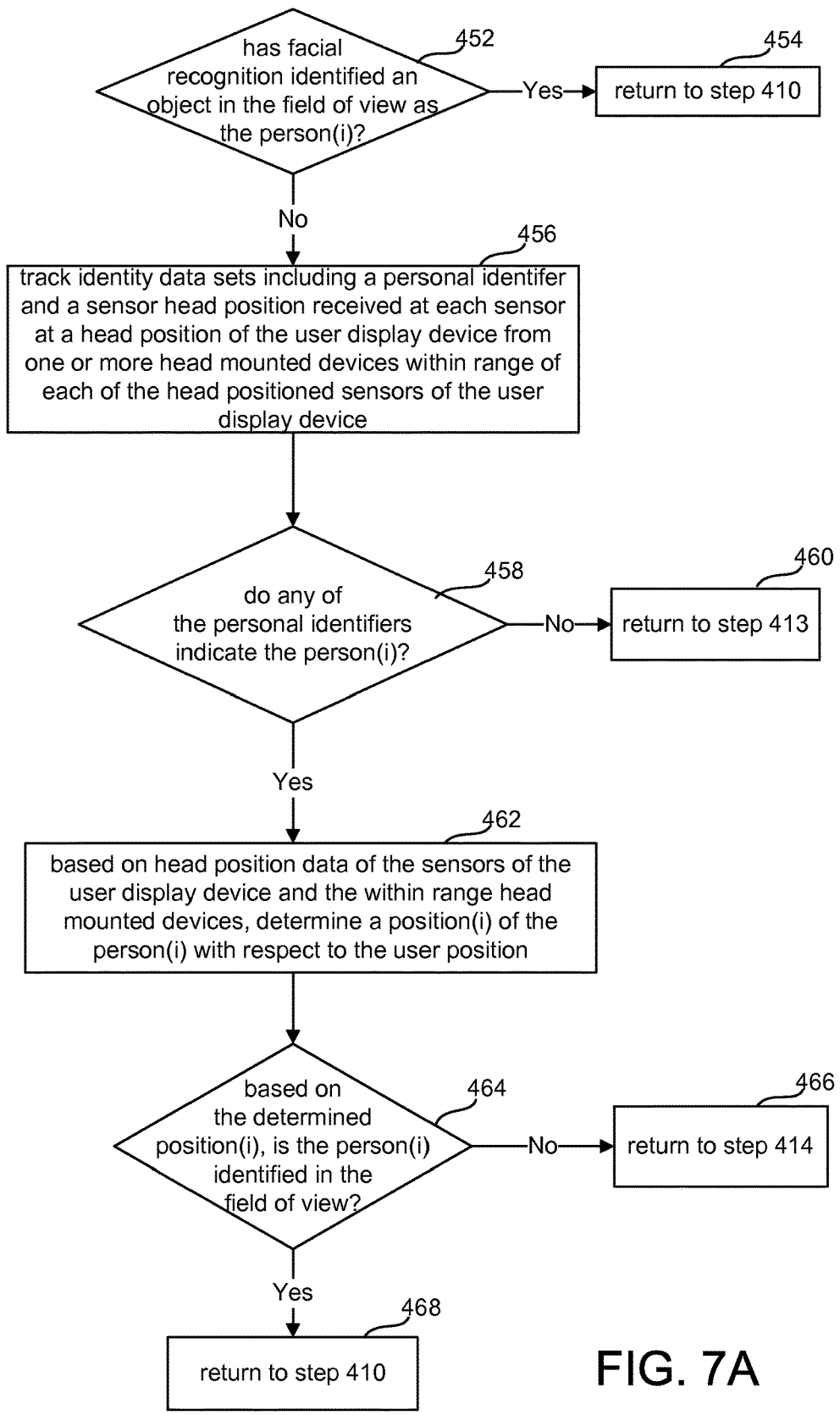
FIG. 7A is a flowchart of an embodiment of a process for determining whether a person associated with a respective personal identification data set is currently within a field of view of the user's mixed reality display device system.
Figure 7B:
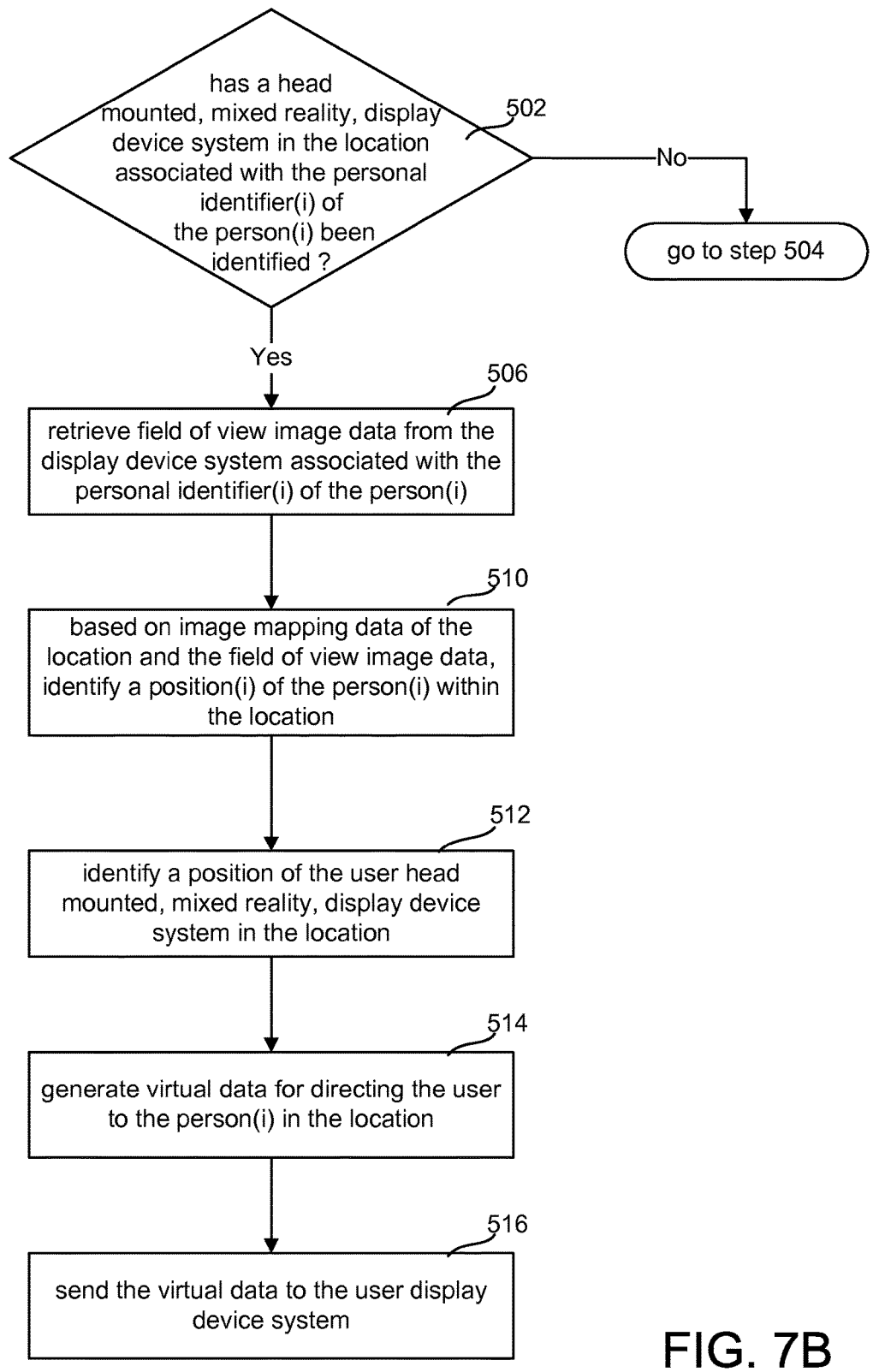
FIG. 7B is a flowchart of an embodiment of a process for determining a position of a person associated with a respective personal identification data set and not identified within the user field of view but who is associated with a head mounted, mixed reality display device system in the location.

FIGS. 7A and 7B illustrate examples of implementation processes which may be used for determining whether a person is identified within a field of view of the user and determining a position of the person if not identified in the field of view. The person is typically identified in image data via facial recognition or pattern recognition such as comparison with a skeletal model or some combination of these. In processing image data for motion tracking, often people and things in image data are assigned object identifiers to track their motion. In some examples, the cloud based PI engine 204 assigns a unique object identifier to each person in a location, and tracks a position of each of the one or more users within the location based on an image mapping of the location. The unique object identifier can then be used by all display devices in the location for tracking objects. For determining whether an object associated with the unique object identifier assigned to the person is within the field of view of the user display device system, the PI engine 204 correlates image data received from at least one field of view camera of the user display device system and the position of the person in the image mapping of the location.

Some examples of a location can be a home, a work place, a campus, a geofenced area, a conference center, a room at a conference center and smaller and bigger locations as a user may indicate via user input data to the PI service engine or application 204, 204$_1$.

FIG. 7A is a flowchart of an embodiment of a process for determining whether a person associated with a respective personal identification data set can currently be identified within a field of view of the user's mixed reality display device system. The process is discussed from the perspective of the display device system 8, but may also be performed by a PI service engine 204 executing remotely with access to the user field of view data.

In step 452, the client PI service application 204₁ determines whether facial recognition has identified an object in the field of view as the person(i). If so, in step 454, the application 204₁ returns to execute step 410. If facial recognition has not identified the person(i), the client PI service application 204₁ in step 456 tracks identity data sets including a personal identifier and a sensor head position received at each sensor at a head position of the user display device system from one or more head mounted devices within range of each of the head positioned sensors of the user display device system. In other embodiments, the sensor position may be referenced to another body part other than the head or be a particular position on the head.

In step 458, the application 204₁ determines whether any of the personal identifiers indicate the person(i) associated with the respective personal identification data set(i). If not, the client PI service application 204₁ returns to step 413 in step 460. If the person(i) is associated with one of the personal identifiers, then in step 462, based on head position data of the sensors of the user display device and the within range head mounted, mixed reality, display device systems, the client PI service application 204₁ determines a position (i) of the person(i) with respect to the user position. In step 464, based on the determined position(i), it is determined whether the person(i) is identified in the field of view. For example, the object recognition engine 192 can provide identifying information like personal or physical features height, body shape, skin color, hair color, eye color, etc. for all person objects in the field of view to the client PI service application 204₁. With the direction and distance of a determined position(i) for a person and personal identification data from the user profile data of the person(i) like hair color, height and skin color, the client PI service application 204₁ may execute a predetermined weighted average algorithm based on the position and identified personal features to determine whether a person object in the field of view is the person(i) based on a probabilistic criteria.

If the person(i) is not identified in the field of view, in step 466, the client PI service application 204₁ returns to step 414, but if the person(i) is identified in the field of view, the application in step 468 returns to step 410 and causes the display device system 8 to output identifying data for the person(i) in the field of view.

The sound recognition engine 194 can also aid in identifying the person(i) by indicating whether a voice identified with the person based on voice recognition data in the person(i)'s user profile data is being detected, and can identify the voice for the user as that of the person(i). The user can then listen for the voice around him and move his head in the direction of the voice if heard which will aid the application 204₁ in visually identifying the person(i).

Figure 7C:
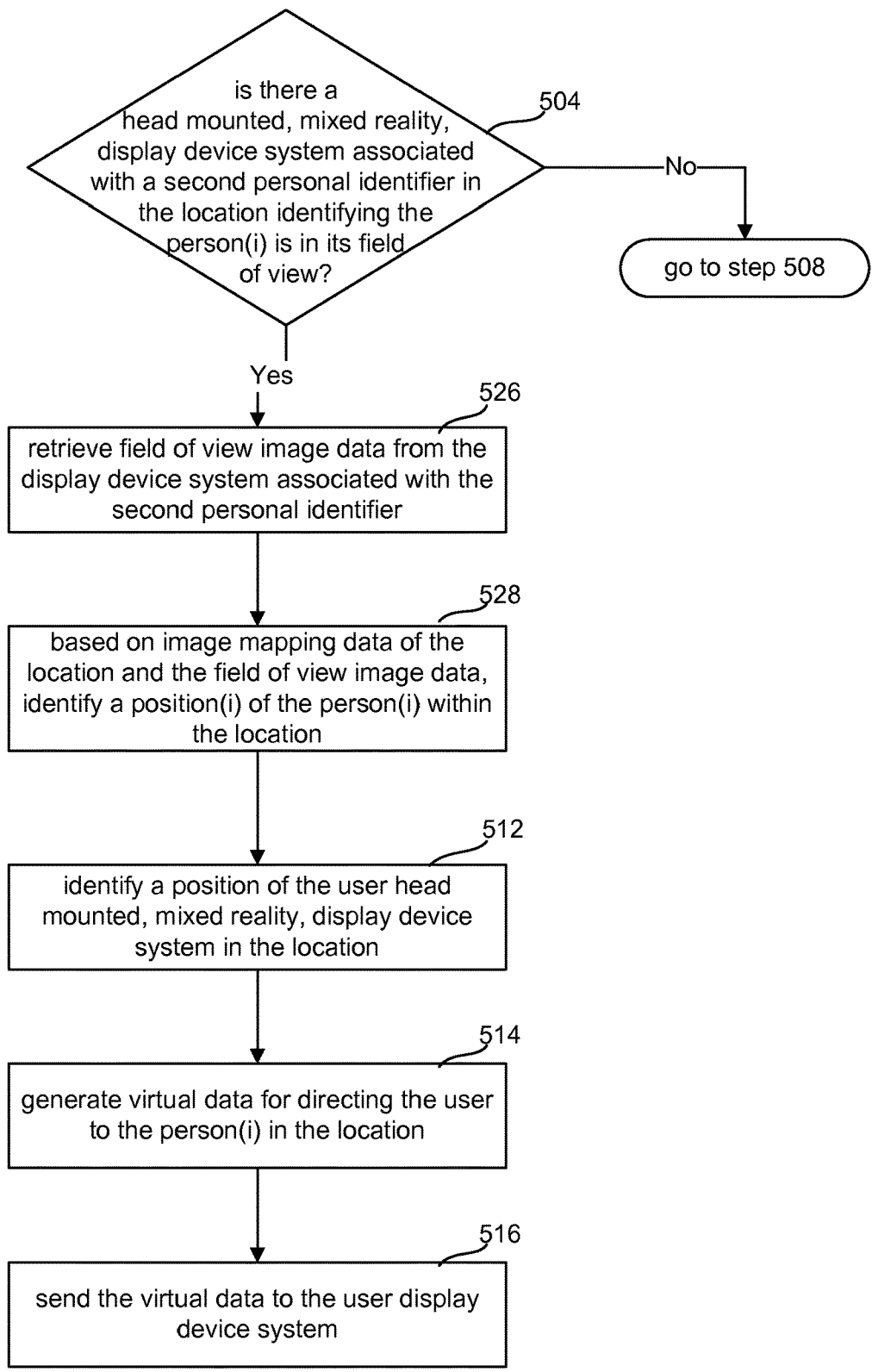
FIG. 7C is a flowchart of an embodiment of a process for determining a position of a person within the location and associated with a respective personal identification data set responsive to the person not being within the user field of view but who has been identified in field of view data of another head mounted, mixed reality, display device system.
Figure 7D:
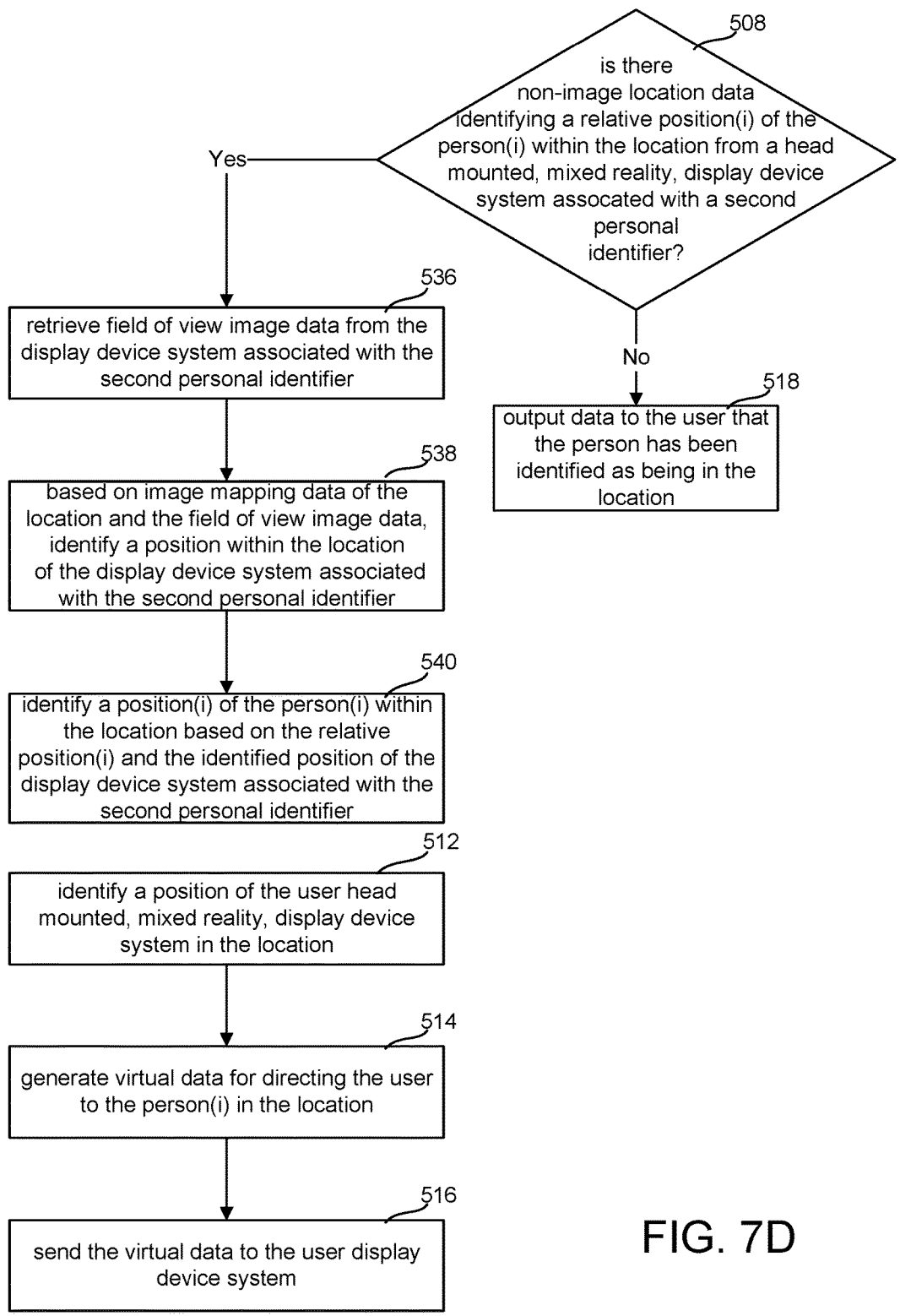
FIG. 7D is a flowchart of an embodiment of a process for determining a position of a person within the location and associated with a respective personal identification data set responsive to the person not being within the user field of view but for whom non-image location data indicates a position.

FIGS. 7B, 7C and 7D are flowchart of an embodiment of a process for determining a position of a person associated with a respective personal identification data set within the location responsive to the person not identified as being within the user field of view. FIG. 7B is a flowchart of an embodiment of a process for determining a position of a person associated with a respective personal identification data set and not identified within the user field of view but who is associated with a head mounted, mixed reality display device system in the location. FIG. 7B is discussed for illustrative purposes from the perspective of the cloud based PI service engine 204 which can have access to data from display devices and other computing devices throughout the location. In step 502, the cloud based PI service engine 204 determines whether there has been identified a head mounted, mixed reality display device system in the location associated with the personal identifier(i) of the person(i) associated with the respective personal identification set(i) capturing field of view data. Responsive to such a device being identified, in step 506, the PI engine 204 retrieves field of view image data from the display device system associated with the personal identifier(i) of the person(i), and based on image mapping data of the location and the field of view image data in step 510, identifies a position(i) of the person(i) within the location.

In step 512, the PI engine 204 identifies a position of the user head mounted, mixed reality, display device system in the location, and in step 514, generates virtual data for directing the user to the person(i) in the location which is sent in step 516 to the user display device system.

If the determination in step 502 had determined that a head mounted, mixed reality display device system associated with the person(i) capturing field of view data has not been identified, the cloud based PI service engine 204 proceeds to step 504 of FIG. 7C.

FIG. 7C is a flowchart of an embodiment of a process for determining a position of a person within the location and associated with a respective personal identification data set responsive to the person not being within the user field of view but who has been identified in field of view data of another head mounted, mixed reality, display device system.

In step 504, the PI service engine 204 determines whether there is a head mounted, mixed reality, display device system associated with a second personal identifier in the location identifying the person(i) associated with the at least one personal identification data set(i) is in its field of view. The second personal identifier identifies a wearer of an HMD other than the person(i) or the user. In other words, if the user does not have the person in her field of view, and the person is not wearing a device or transmitting field of view data, someone else may be uploading field of view data which facial recognition software has processed and has identified the person(i). If there is such a display device system associated with a second personal identifier in the location which has the person(i) identified in its field of view data, the cloud based PI engine 204 in step 526 retrieves field of view image data from the display device system associated with the second personal identifier, and in step 528 identifies a position(i) of the person(i) within the location, based on image mapping data of the location and the field of view data retrieved from the display device system associated with the second personal identifier. Steps 512, 514 and 516 are then performed based on the identified position(i) and the user position.

FIG. 7D is a flowchart of an embodiment of a process for determining a position of a person within the location and associated with a respective personal identification data set responsive to the person not being within the user field of view but for whom non-image location data indicates a position.

If there is not a device associated with a second personal identifier which has the person(i) identified in its field of view, then the PI service engine 204, determines in step 508 whether there is non-image location data identifying a relative position (i) of the person(i) within the location from a head mounted, mixed reality display device system associated with a second personal identifier. As mentioned above, non-image location data can be based on directional sensor data from one or more sensors, each having a known range. The non-image location data can be from one or more devices surrounding the person(i) associated with the respective personal identification data set(i).

If there is non-image location data indicating a position of the person within the location from a head mounted, mixed reality, display device system associated with a second personal identifier, the PI engine 204 retrieves field of view image data from the display device system associated with the second personal identifier in step 536. In step 538, based on image mapping data of the location and the field of view image dat, a position within the location of the display device system associated with the second identifier is identified. In step 540, a position(i) of the person(i) within the location is identified based on the relative position(i) and the identified position of the display device system associated with the second personal identifier. The process continues by performing steps 512, 514 and 516.

If there is no non-image location data from which a relative position(i) within the location to the user can be determined, then the PI engine 204 in step 518, outputs data to the user that the person(i) has been identified as being within the location or the most detailed position data the engine 204 currently has for the person(i).

In some examples, the non-image data can also come from the device associated with the person sought in the form of an identity set which is transferred to a directional sensor in the location.

The PI service engine 204 also can track personal interactions or lack of interactions with other users for the user. For example, if a user at a software gaming conference sets person selection criteria of people with a virtual machine language for gaming applications Zebron (a fictitious name used only for illustrative purposes), the PI service identifies the people for the user either in the user field of view or with position data. The service can also track whether the user paid attention to the identified people or not while at the conference. A personal interaction can be identified for each identified person which may indicate an attention level. Personal interactions can also be tracked for people not part of the set of people satisfying person selection criteria.

Figure 8A:
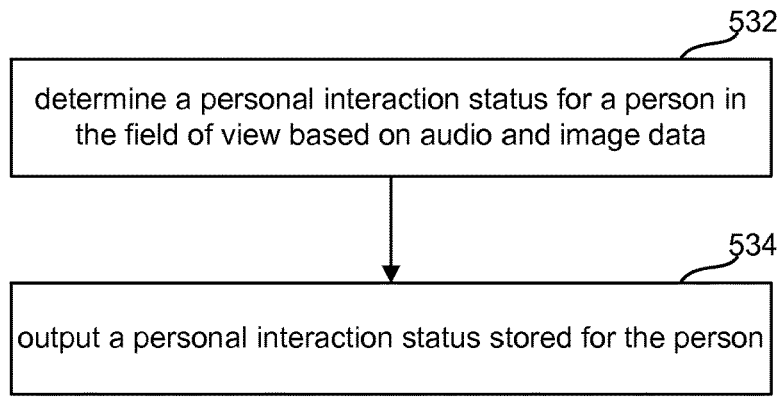
FIG. 8A is a flowchart of an embodiment of a process for tracking personal interactions with one or more people in a location.

FIG. 8A is a flowchart of an embodiment of an overall process for tracking personal interactions with one or more people in a location. In step 532, the PI service engine or application 204, 204₁ determines a personal interaction status for a person in the field of view based on audio and image data, and in step 534, stores and outputs a personal interaction status for the person.

Figure 8B:
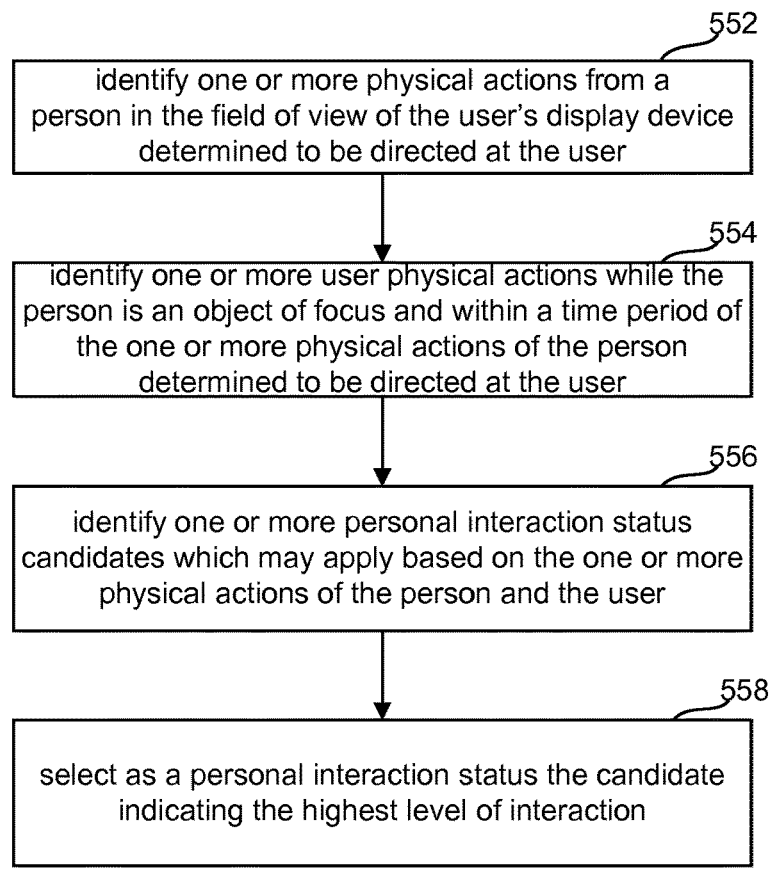
FIG. 8B is a flowchart of an embodiment of a process for determining a personal interaction status for a person.

FIG. 8B is a flowchart of an embodiment of a process for determining a personal interaction status for a person. In 552, the PI service application 204, 204₁ identifies one or more physical actions of a person in the field of view of the user's display device determined to be directed at the user. For example, the person may be waving but his head position, and eye position if captured, indicates he is not waving at the user. An interaction status for such a person would be none.

In step 554, the PI service application 204, 204₁ identifies one or more user physical actions while the person is an object of focus and within a time period of the one or more physical actions of the person determined to be directed at the user. The time period may be before or after the one or more physical actions of the person. For example, eye data indicates the person is an object of focus, the user waved her hand in the field of view of her display device system 8, and the person made a hand wave while his face is centered in her field of view image data from cameras 113. Such an interaction would illustrate a gesture acknowledgement type of personal interaction.

In step 556, the PI service application 204, 204₁ identifies one or more personal interaction status candidates which may apply based on the one or more physical actions of the person and the user, and in step 558 selects as a personal interaction status the candidate indicating the highest level of interaction. For example, the PI service application 204, 204₁ accesses and implements the personal interaction rule set 178 for linking one or more physical actions and data indicating at whom the one or more physical actions are directed.

Some examples of personal interaction statuses in order of increasing level of interaction are none, a gesture acknowledgement, a spoken greeting, conversation, conversation related to user profile data, and conversation related to person selection criteria. A spoken greeting may be detected from audio data received via the microphone 110 based on a dictionary in the personal interaction rule set 178 of customary words indicating greeting in the one or more languages used in the location. For example, the user saying "hello" while gaze data indicates a person in her field of view, and her field of view image data indicating a person looking at her within a time period with lips moving and the words "hi" being received by the microphone of a voice not the user's would indicate a spoken greeting.

A continuation of spoken words while the person appears to be focused on the user in her field of view image data, and her gaze data indicates the person continues to be an object of focus for the user indicates conversation. Sound recognition software 194 can compare the voice of the person to voice profiles to see if the person is a known associate of the user based on user profile data if the person has not been identified already. The sound recognition software 194 can convert the audio data to be put into a text format which the PI service application 204, 204₁ can search for identifying words spoken related to user profile data and the person selection criteria. If so, the personal interaction status can be one of conversation related to user profile data, conversation related to person selection criteria or both. Keywords associated with the aspect of user profile data or person selection criteria discussed can be selected and stored in memory as well. If the user has a personal identification data set stored for the person, the personal interaction status and any related keywords can be stored in the user's copy of the personal identification data set for the person.

Such interaction characterizations can help jog the user's memory about the different people she has met. They can also indicate her effectiveness at making connections with intended people. For example, if she had conversation related to person selection criteria of people working on HMD devices with two out of ten people she did not know, but identified for her at a mixed reality professional conference, but spent an hour talking about skydiving with her office mate at the conference, she needs to improve her work related knowledge sharing efforts.

Figure 9:
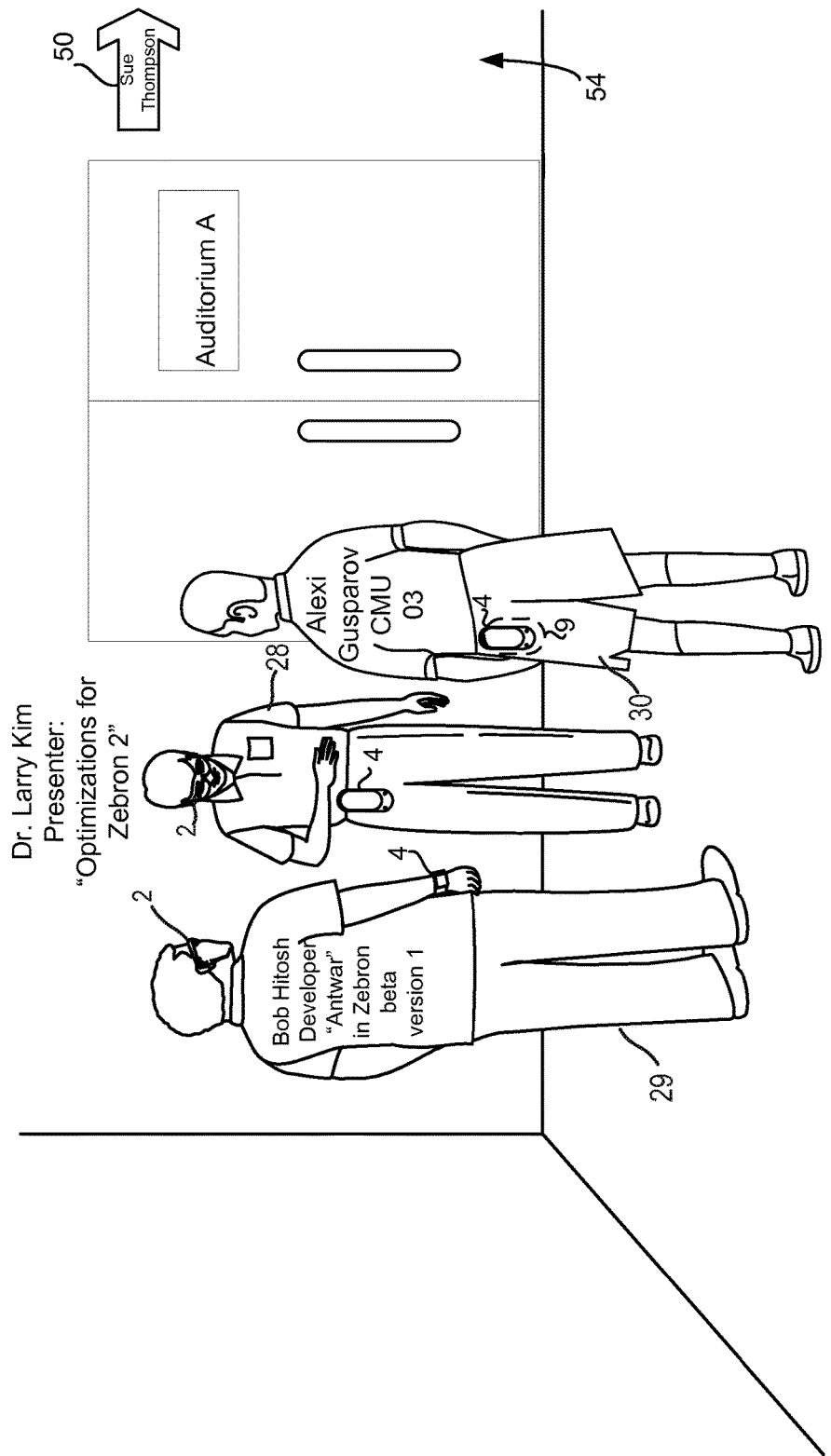
FIG. 9 illustrates an example of providing contextual personal information to a user wearing a head mounted, mixed reality display device system.

FIG. 9 illustrates an example of providing contextual personal information to a user wearing a head mounted, mixed reality display device system. In this example, a user, for example Betty, is attending the annual "Zebron" conference which many colleagues and people in her field of game development attend. The personal information service engine 204 has determined Betty's location based on GPS data as a particular conference center, and has no data indicating she has been there before.

The PI engine 204 has identified a social context as work and a sub-setting of conference and has determined the subject matter of the conference is "Zebron" a popular virtual machine language used by game developers. Betty enters person selection criteria of experience with Zebron 2 or Zebron 1. Additionally, Betty enters another person selection criteria for any person who shares common aspects of her educational and work experience, for example those with the same major, same college, same company or same languages programmed.

Fortunately, other people at the conference have also registered with the PI service engine 204 or grant temporary permission for access to their user profile data from one or more applications for the time and place of the conference. For example, Bob Hitosh has allowed information from his online resume relating to Zebron to be made available for others with mixed reality display device systems 8 for the conference. Alexi Gusparov has permitted the PI service 204 to release information from his resume generally that may have a relation to others at the conference. Public information on the conference's website has provided image data for Dr Kim and that he will be presenting on the topic of "Optimizations for Zebron 2."

The PI service engine 204 sends personal identification data sets including the person selection criteria they relate to for Dr. Kim, Sue Thompson and Bob Hitosh to Betty for the Zebron related person selection criteria. The PI service engine 204 also sends a personal identification data set for Alexi Gusparov to Betty's device system as Alexi went to Carnegie Mellon University like Betty and majored in computer science.

The client PI application $204_1$ identifies Dr Kim 28 in Betty's field of view, and displays text on the wall 54 behind him as he considers a question from Bob. The text includes a description from the conference website of "Dr. Larry Kim Presenter: "Optimizations for Zebron 2" Identity data sets may also have been exchanged between directional sensors of the display device systems 8 of Dr. Kim, shown as a display device 2 and a mobile device as a processing unit 4, and Betty's system which uses a wrist based processing unit 4.

The cloud based PI service engine 204 has identified Alexi is in the room via GPS, and Betty's display device system 8 has exchanged identity data sets with Alexi's smartphone 4 even though Alexi is not wearing his display device 2 like Dr. Kim 28 and Bob 29. Based on the position of Alexi in the room, the client PI application $204_1$ identifies Alexi in Betty's field of view and displays on his shirt, his name and "CMU 03."

Betty knows Bob 29 outside of work, but the cloud based PI engine 204 identifies an accomplishment of Bob's for Zebron from his resume items he has permitted to be shared as the PI service engine 204, $204_1$ has no record of Betty viewing Bob's online resume. Bob has been recognized also by directional sensors on Betty's display device 2 picking up identity data sets emitted from sensors 145 on the back of the temples of Bob's display device 2. Text from Bob's resume is displayed on Bob's shirt: "Bob Hitosh Developer of "Antwar" in Zebron beta version 1."

In other examples, each of Bob, Dr. Kim, Alexi and Betty may also have been tracked by location sensors, for example cameras, in the conference center and their positions relayed by the PI service engine 204 to Betty's client PI application $204_1$.

Sue Thompson is not in Betty's field of view. The PI service engine 204 has identified Sue's position and sends virtual data for directions to Betty's device system 8 which the client side PI application $204_1$ causes to display. The virtual data is a series of arrows which direct Betty to Sue from Betty's current location. In the illustrated example, a virtual arrow 50 stating "Sue Thompson" appears integrated as a painted arrow on the wall 54 pointing to the right of Auditorium A. The arrows will update as Betty or Sue moves, and Betty can clear the display if she wishes as well via a user input command.

FIG. 10 is a block diagram of one embodiment of a computing system that can be used to implement one or more network accessible computing systems 12 which may host at least some of the software components of computing environment 54 or other elements depicted in FIG. 3. With reference to FIG. 16, an exemplary system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 10 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 10 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

Figure 11:
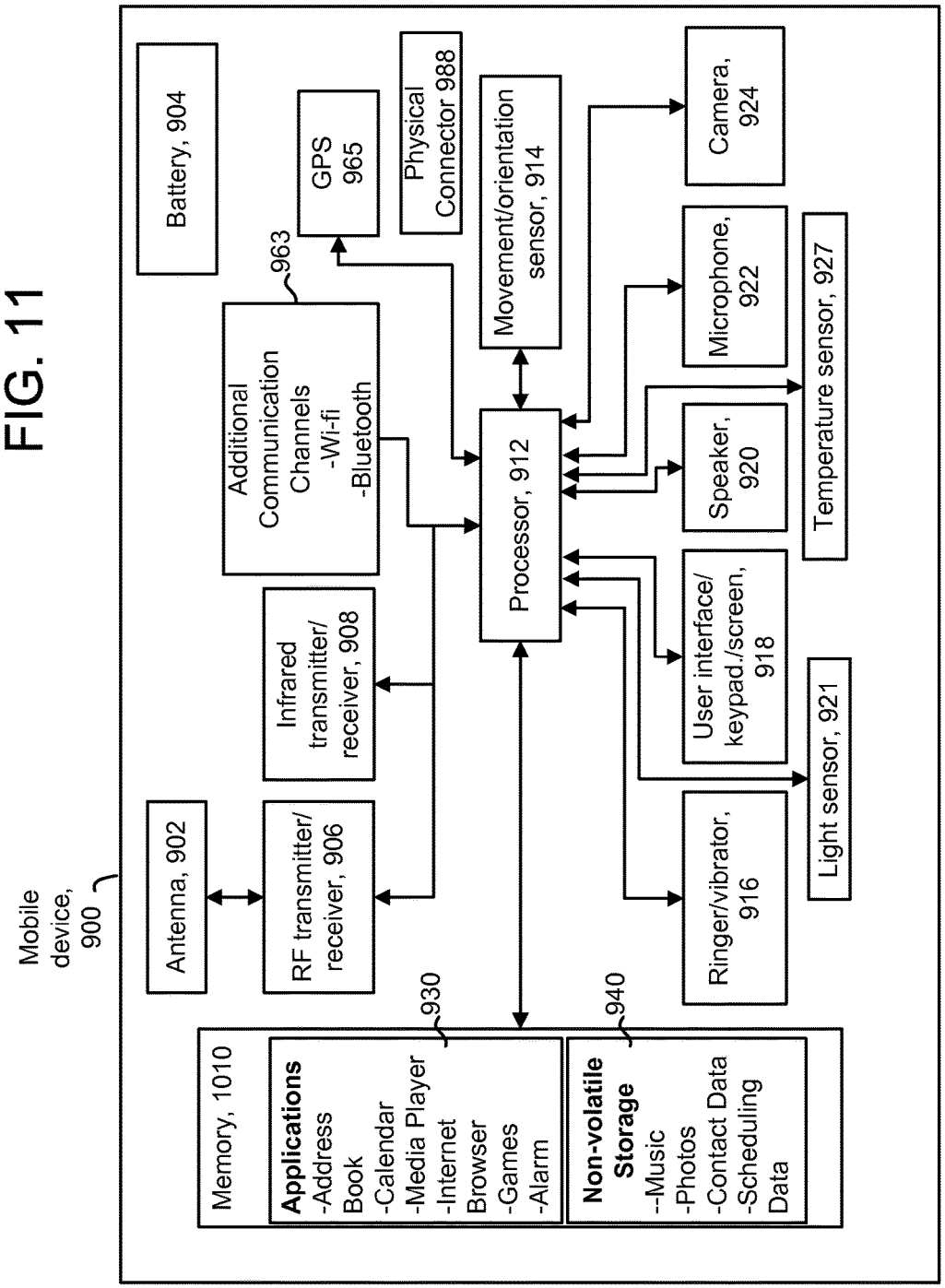
FIG. 11 is a block diagram of an exemplary mobile device which may operate in embodiments of the technology.

As discussed above, the processing unit 4 may be embodied in a mobile device. FIG. 11 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electro-mechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine-system implemented method of determining that a first among a plurality of areas is not occupied by one or more persons of specific interest to a user of the machine system, the method comprising:

receiving person selection criteria by way of one or more mobile devices of the user where the one or more mobile devices are operatively coupled to the machine system, the received person selection criteria being usable by the machine system to identify one or more candidate persons in a pool of candidate persons satisfying specific criteria of the received person selection the criteria, the specific criteria specifying one or more characteristics, relationships, interests and experiences of the one or more candidate persons of specific interest to the user because of said specified one or more of characteristics, relationships, interests and experiences, where the machine system has access to at least one user profile of at least one of the one or more candidate persons;

automatically determining a current location of the user;

automatically identifying a first among a plurality of automatically searchable areas each capable of containing one or more persons and each capable of automated detecting of identities of one or more persons in that area, the identified first area being most or second most proximate to the determined current location of the user;

based on use of one or more persons identifying services, automatically determining whether the identified first area contains any candidate persons currently satisfying the specific criteria of the person selection criteria received from the user;

responsive to the one or more persons identifying services failing to indicate presence of any candidate person currently satisfying the specific criteria of the received person selection criteria within the identified first area, indicating to the user by way of at least one of said one or more mobile devices of the user that are operatively coupled to the machine system that the first area does not contain at least one person currently satisfying the received person selection criteria;

responsive to the one or more persons identifying services indicating presence of at least one candidate person currently satisfying the specific criteria of the received person selection criteria within the identified first area, generating a personal identification data set for the at least one candidate person;

determining whether the at least one candidate person is currently within a field of view of the machine system based at least on received field of view data; and responsive to the at least one candidate person falling within the field of view of the machine system, outputting audio and/or visual data associated with the personal identification data set to the user.

2. The method of claim 1 wherein the used one or more persons identifying services include one or more persons locating services.

3. The method of claim 2 wherein the used one or more persons locating services include a GPS based service.

4. The method of claim 2 wherein the used one or more persons locating services include an automated features recognition service.

5. The method of claim 4 wherein the automated features recognition service uses one or more head mounted devices (HMDs) each capable of identifying its respective wearer and location of that respective wearer and each operatively coupled to a network by way of which the identity of its respective wearer can be reported.

6. The method of claim 5 wherein the one or more HMDs each have one or more outwardly facing sensors usable for automatically identifying locally disposed other persons.

7. The method of claim 6 wherein the one or more outwardly facing sensors include depth cameras usable for providing a local object recognition service.

8. The method of claim 6 wherein the one or more outwardly facing sensors include sound recognition sensors usable for providing sound-based recognition of the locally disposed other persons.

9. The method of claim 4 wherein the automated features recognition service uses one or more at location, physical reality capturing devices each operatively coupled to a network and each capable of capturing physical features of persons and objects disposed proximate to the physical reality capturing device.

10. The method of claim 1 wherein the used one or more persons identifying services do not report whether the identified first area contains or does not contain a given person currently satisfying the person selection criteria received from the user if the given person has indicated a desire to not be automatically identified.

11. The method of claim 1 wherein the specific criteria specify specific one or more of characteristics and the specific characteristics include at least one of a satisfactory candidate person's gender, a satisfactory candidate person's height, a satisfactory candidate person's social attributes, a satisfactory candidate person's political attributes, a satisfactory candidate person's religious attributes, a satisfactory candidate person's economic attributes and a satisfactory candidate person's employment related attributes.

12. The method of claim 1 wherein the specific criteria specify specific one or more of relationships and the specific relationships include at least one of a satisfactory candidate person's belonging to one or more restricted access friendship categories, having ownership of a specific kind of property, belonging to a specific organization, and belonging to a specific social media users group.

13. The method of claim 1 wherein the specific criteria specify specific one or more of interests and the specific interests include at least one of a satisfactory candidate person's interest in one or more hobbies and a satisfactory candidate person's interest in one or more fields of knowledge.

14. The method of claim 1 wherein the specific criteria specify specific one or more of experiences and the specific experiences include at least one of a satisfactory candidate person's work related experiences and a satisfactory candidate person's leisure related experiences.

15. An automated machine system for determining that a first among a plurality of areas is not occupied by one or more persons of interest, the machine system comprising:
   a receiver configured to receive person selection criteria by way of one or more mobile devices of the user where the one or more mobile devices are operatively coupled to the machine system, the received person selection criteria being usable to identify one or more candidate persons in a pool of candidate persons satisfying specific criteria of the received person selection criteria, the specific criteria specifying one or more of the characteristics, relationships, interests and experiences of the one or more candidate persons of specific interest to the user because of said specified one or more characteristics, relationships, interests and experiences, where the machine system has access to at least one user provide of at least one of the one or more candidate persons;
   a user locator configured to automatically determine a current location of the user;
   an areas identifier configured to automatically identify a subset among a plurality of automatically searchable areas each capable of containing one or more persons and each capable of automated detecting of identities of one or more persons in that area, the identified subset including at least one of a most or second most proximate searchable area relative to the determined current location of the user;
   an area occupancy determiner configured to use one or more persons identifying services and to automatically determine, based on use of the one or more persons identifying services, whether the identified subset of automatically searchable areas contains any persons satisfying the received person selection criteria received from the user;
   an area occupancy reporter coupled to the area occupancy determiner and configured to report to the user by way of at least one of said one or more mobile devices of the user that the subset of automatically searchable areas does not contain any person satisfying the received person selection criteria;
   a personal information engine configured to:
      responsive to the one or more persons identifying services indicating presence of at least one candidate person currently satisfying the specific criteria of the received person selection criteria within the identified first area, generate a personal identification data set for the at least one candidate person; and
      determine whether the at least one candidate person is currently within a field of view of the machine system based at least on received field of view data; and
   an image generation unit configured to, responsive to the at least one candidate person falling within the field of view of the machine system, output audio and/or visual data associated with the personal identification data set to the user.

16. The machine system of claim 15 wherein:
   the used one or more persons identifying services include one or more persons locating services;
   the used one or more persons locating services include an automated features recognition service; and
   the automated features recognition service uses one or more head mounted devices (HMDs) each capable of identifying its respective wearer and location of that respective wearer and each operatively coupled to a network by way of which the identity of its respective wearer can be reported.

17. The machine system of claim 16 wherein the one or more HMDs each have one or more outwardly facing sensors usable for automatically identifying locally disposed other persons.

18. The machine system of claim 17 wherein the one or more outwardly facing sensors include depth cameras usable for providing a local object recognition service.

19. The machine system of claim 15 wherein:
   the used one or more persons identifying services include one or more persons locating services;

the used one or more persons locating services include an automated features recognition service; and the automated features recognition service uses one or more at location, physical reality capturing devices each operatively coupled to a network and each capable of capturing physical features of persons and objects disposed proximate to the physical reality capturing device.

20. A computer-readable storage device operatively coupled to one or more data processing machines and storing instructions readable and executable by at least one of the data processing machines, the stored instructions being configured to cause the one or more data processing machines to carry out an automated process comprising:

receiving person selection criteria by way of one or more mobile devices of the user where the one or more mobile devices are operatively coupled to the machine system, the received person selection criteria being usable by the machine system to identify one or more candidate persons in a pool of candidate persons satisfying specific criteria of the received person selection the criteria, the specific criteria specifying one or more characteristics, relationships, interests and experiences of the one or more candidate persons of specific interest to the user because of said specified one or more of characteristics, relationships, interests and experiences, where the machine system has access to at least one user profile of at least one of the one or more candidate persons;

automatically determining a current location of the user;

automatically identifying a subset of a plurality of automatically searchable areas each capable of containing one or more persons and each capable of automated detecting of identities of one or more persons in that area, the identified subset of areas including at least one that is most or second most proximate to the user;

based on use of one or more persons identifying services, automatically determining whether the identified first area contains any candidate persons currently satisfying the specific criteria of the person selection criteria received from the user;

responsive to the one or more persons identifying services failing to indicate presence of any candidate person currently satisfying the specific criteria of the received person selection criteria within the identified first area, indicating to the user by way of at least one of said one or more mobile devices of the user that are operatively coupled to the machine system that the first area does not contain at least one person currently satisfying the received person selection criteria;

responsive to the one or more persons identifying services indicating presence of at least one candidate person currently satisfying the specific criteria of the received person selection criteria within the identified first area, generating a personal identification data set for the at least one candidate person;

determining whether the at least one candidate person is currently within a field of view of the machine system based at least on received field of view data; and responsive to the at least one candidate person falling within the field of view of the machine system, outputting audio and/or visual data associated with the personal identification data set to the user.

* * * * *